United States Patent [19]

Toyoda et al.

[11] Patent Number: 5,461,440
[45] Date of Patent: Oct. 24, 1995

[54] PHOTOGRAPHING IMAGE CORRECTION SYSTEM

[75] Inventors: Tetsuya Toyoda; Masafumi Yamasaki, both of Tokyo, Japan

[73] Assignee: Olympus Optical Co., Ltd., Tokyo, Japan

[21] Appl. No.: 195,853

[22] Filed: Feb. 10, 1994

[30] Foreign Application Priority Data

Feb. 10, 1993 [JP] Japan .................... 5-022714
Feb. 24, 1993 [JP] Japan .................... 5-035073
Feb. 24, 1993 [JP] Japan .................... 5-035074

[51] Int. Cl.⁶ ..................... G03B 17/24; H04N 1/387
[52] U.S. Cl. ..................... 354/106; 358/444; 358/448; 358/487; 358/302
[58] Field of Search .................... 354/105, 106; 355/40, 41; 358/302, 448, 452, 530, 531, 537, 501, 506, 401, 487; 348/335

[56] References Cited

U.S. PATENT DOCUMENTS 5,365,303  11/1994  Yamasaki et al. ............ 354/106 X

FOREIGN PATENT DOCUMENTS 62-230267  10/1987  Japan .
63-26079   2/1988   Japan .
4-342241   11/1992  Japan .
4-342240   11/1992  Japan .
5-323444   12/1993  Japan .

*Primary Examiner*—W. B. Perkey
*Attorney, Agent, or Firm*—Frishauf, Holtz, Goodman, Langer & Chick

[57] ABSTRACT

An image signal output unit converts an image on a film, which has undergone photography, into an image signal. An image storage unit stores the image signal. A read unit reads the identification code of a camera which is recorded on the film which has undergone photography. An information storage unit stores image quality degradation information and the identification code in pairs. An image processing unit reads out the image quality degradation information from the information storage unit on the basis of the identification code read by the read unit, and corrects the image signal stored in the image storage unit by using the read image quality degradation information.

40 Claims, 20 Drawing Sheets

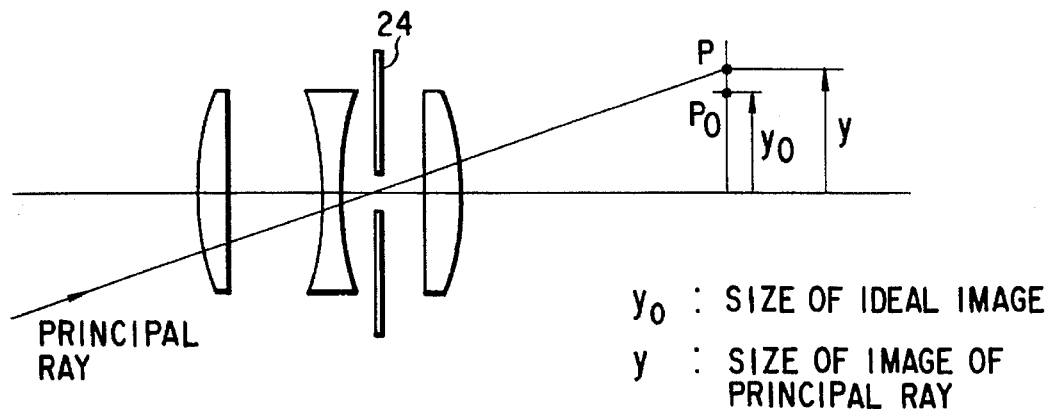
$y_0$ : SIZE OF IDEAL IMAGE
$y$ : SIZE OF IMAGE OF PRINCIPAL RAY
FIG. 5
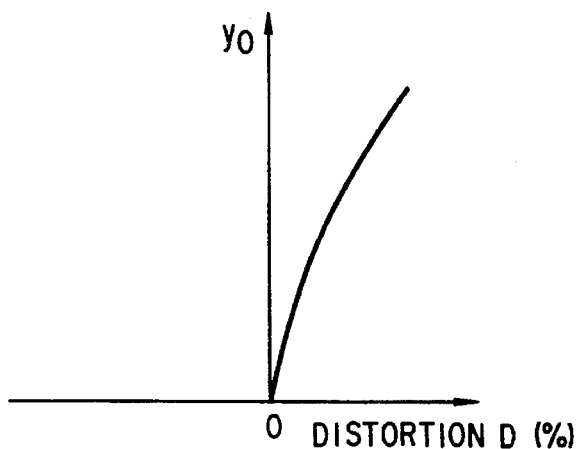
FIG. 6
```
a11 a12 a13           a1n
 o   o   o   o  o  o  o  o
a21 a22 a23           a2n
 o   o   o   o  o  o  o  o
a31 a32 a33           a3n
 o   o   o   o  o  o  o  o
 o   o   o   o  o  o  o
am1 am2 am3           amn
 o   o   o   o  o  o  o  o
```
                                                26
FIG. 7

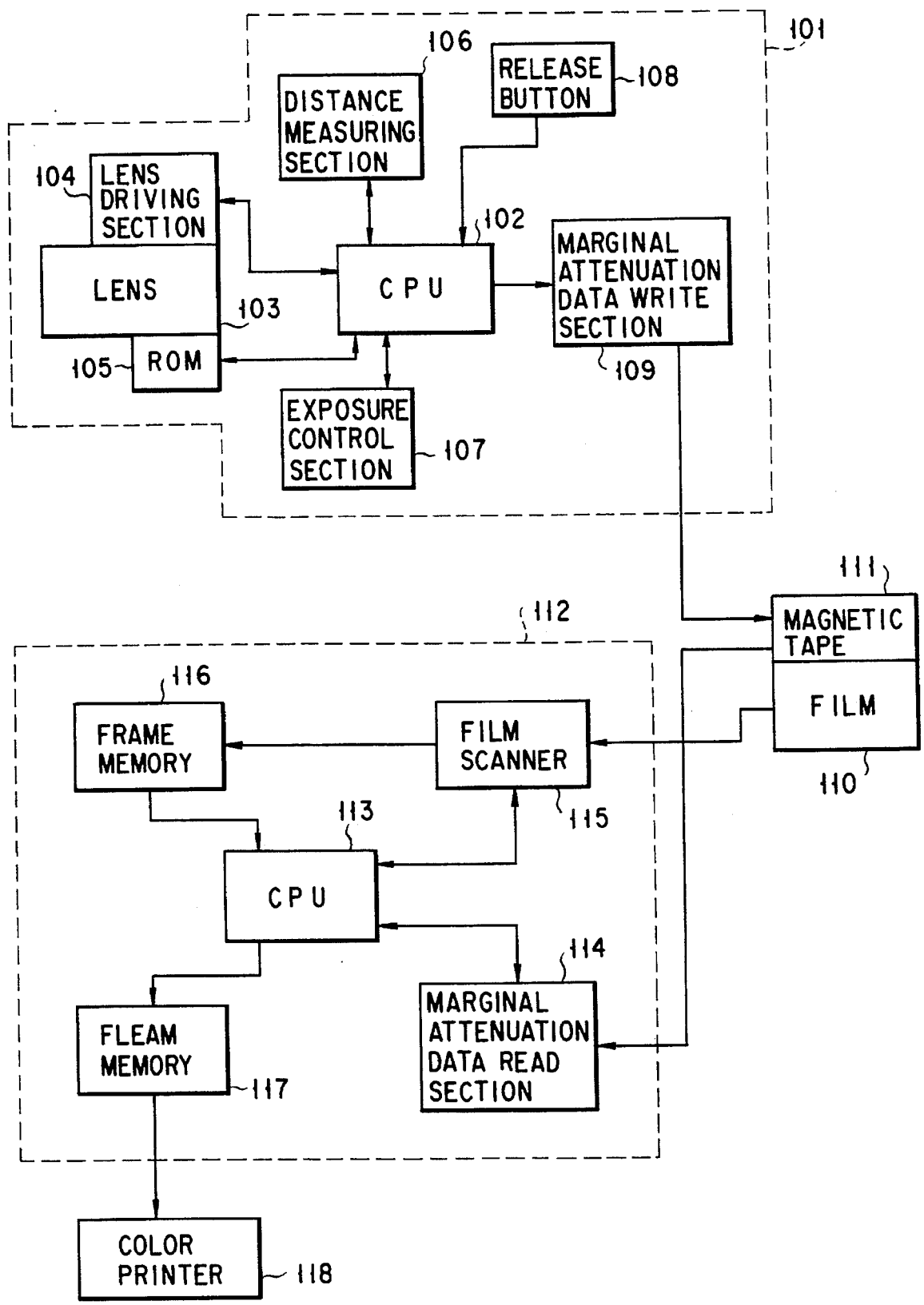
F I G. 11

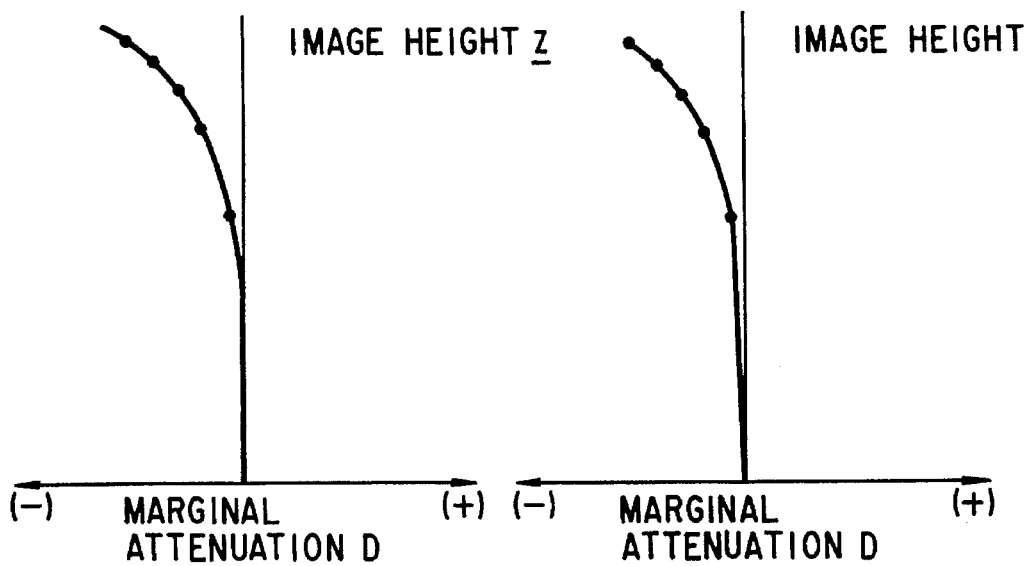
F I G. 14A    F I G. 14B
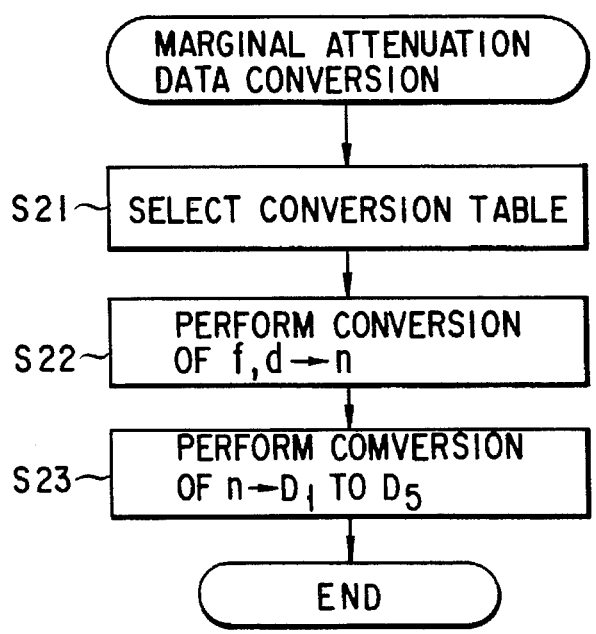
F I G. 15

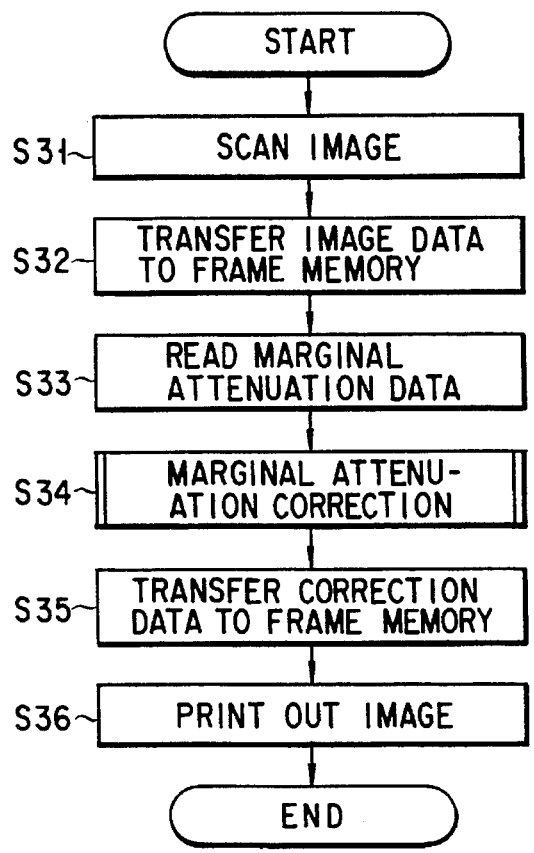
F I G. 16
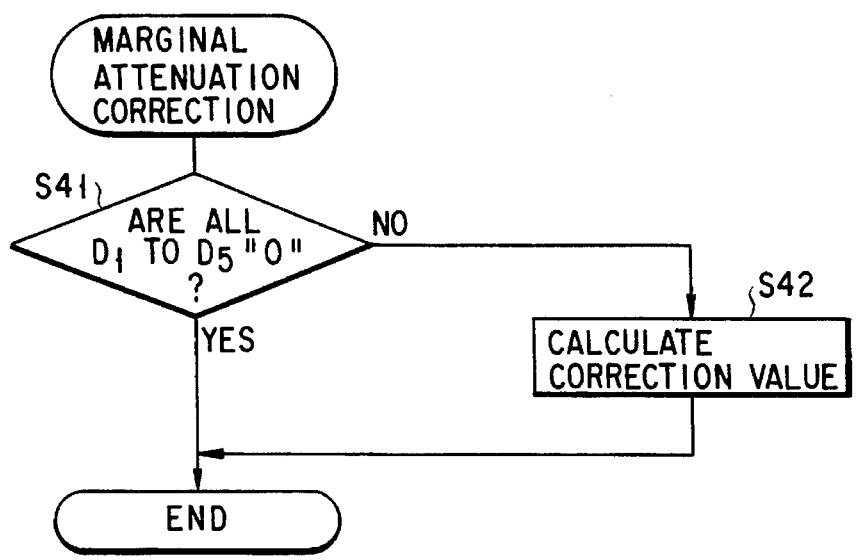
F I G. 17

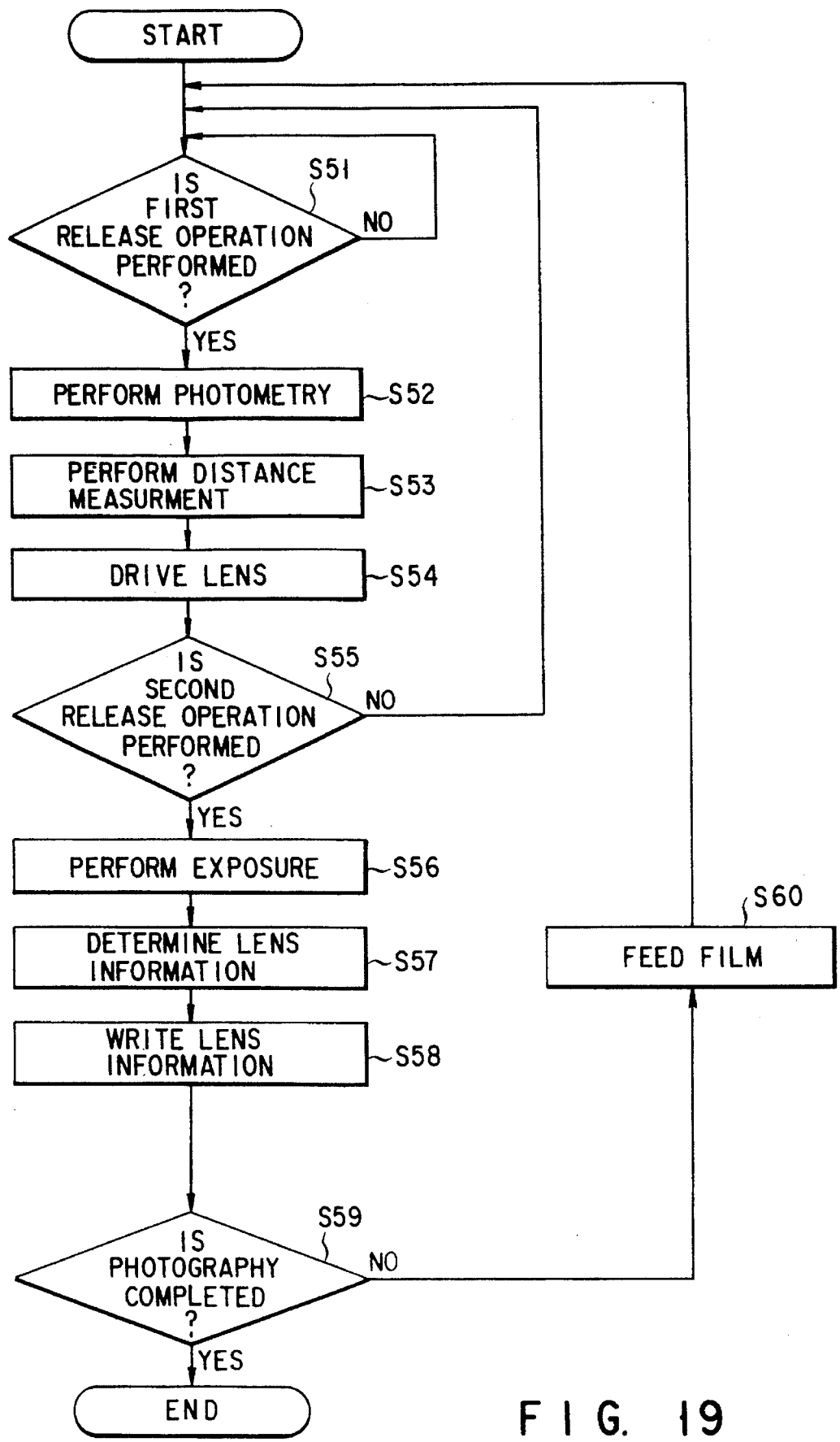
F I G. 19

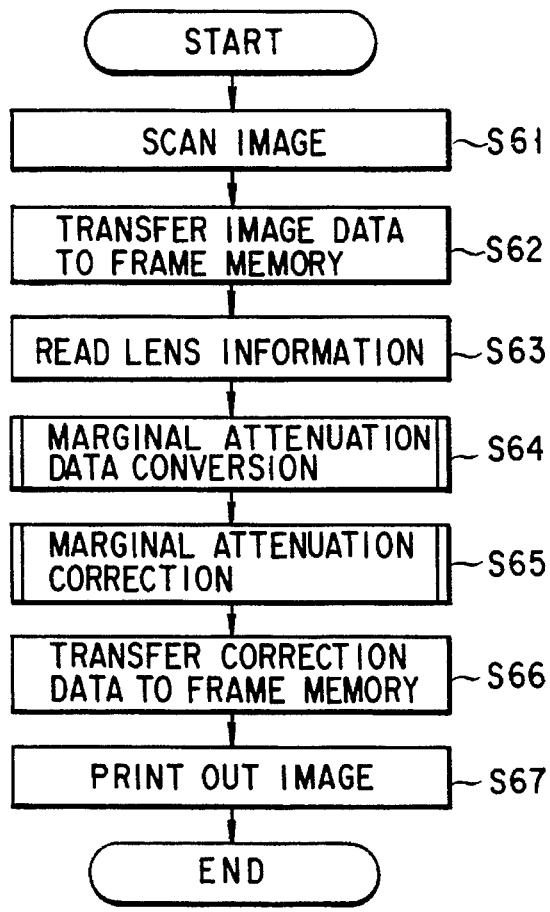
F I G. 20
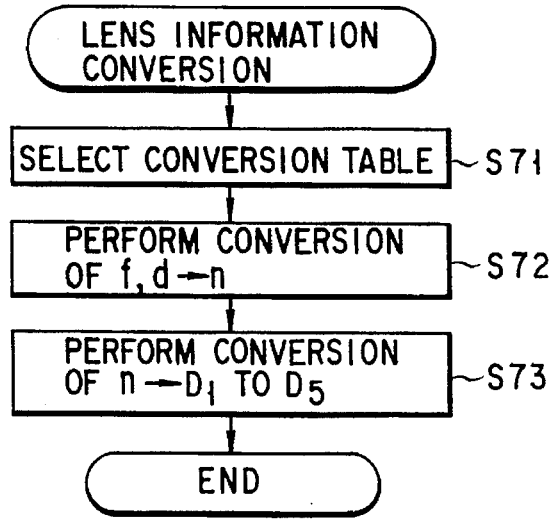
F I G. 21

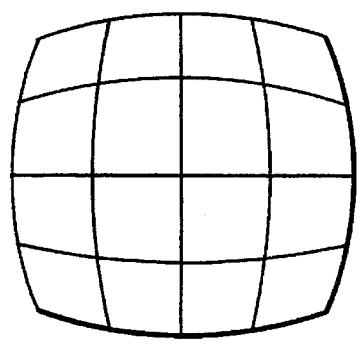
F I G. 26A
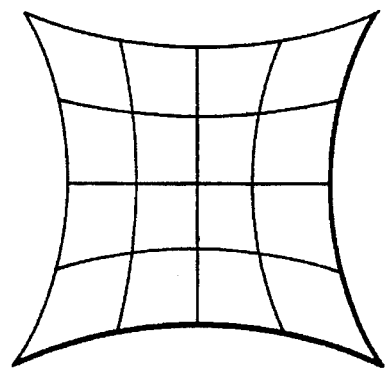
F I G. 26B
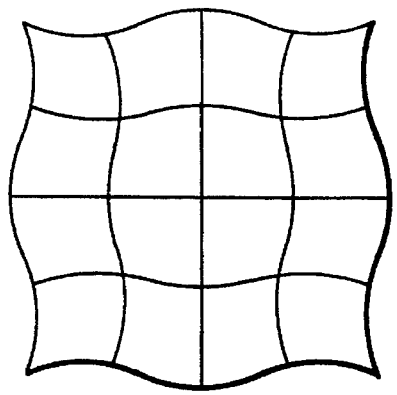
F I G. 26C
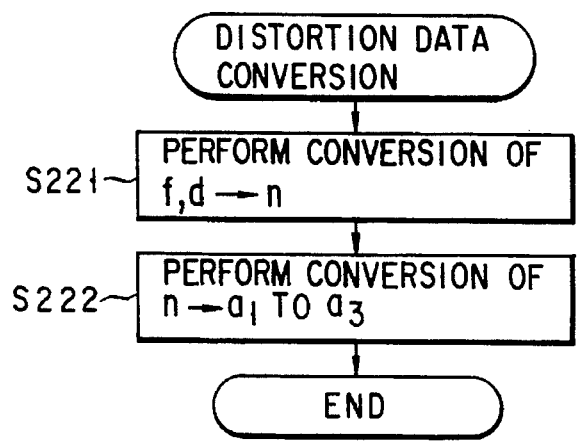
F I G. 27

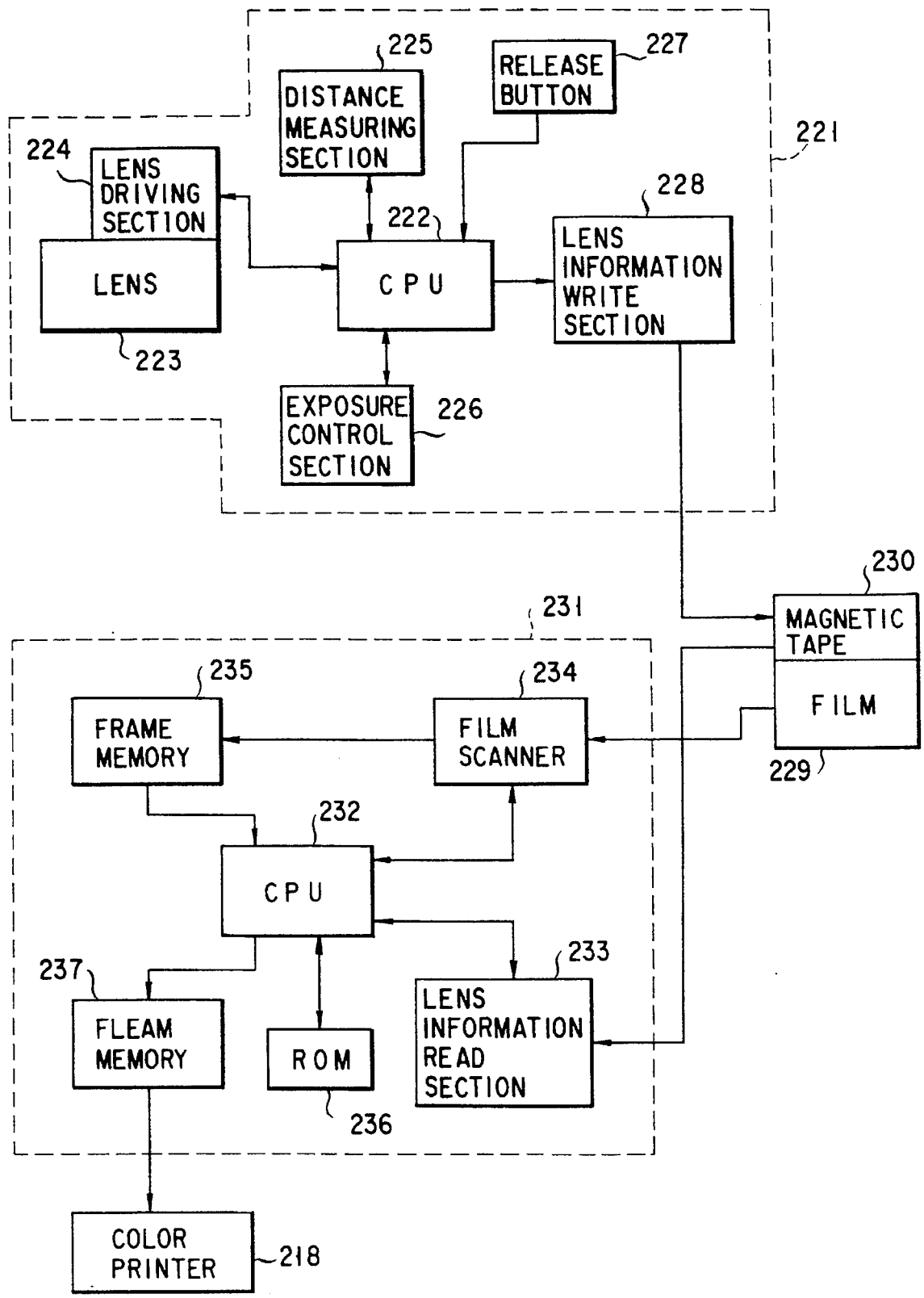
F I G. 30

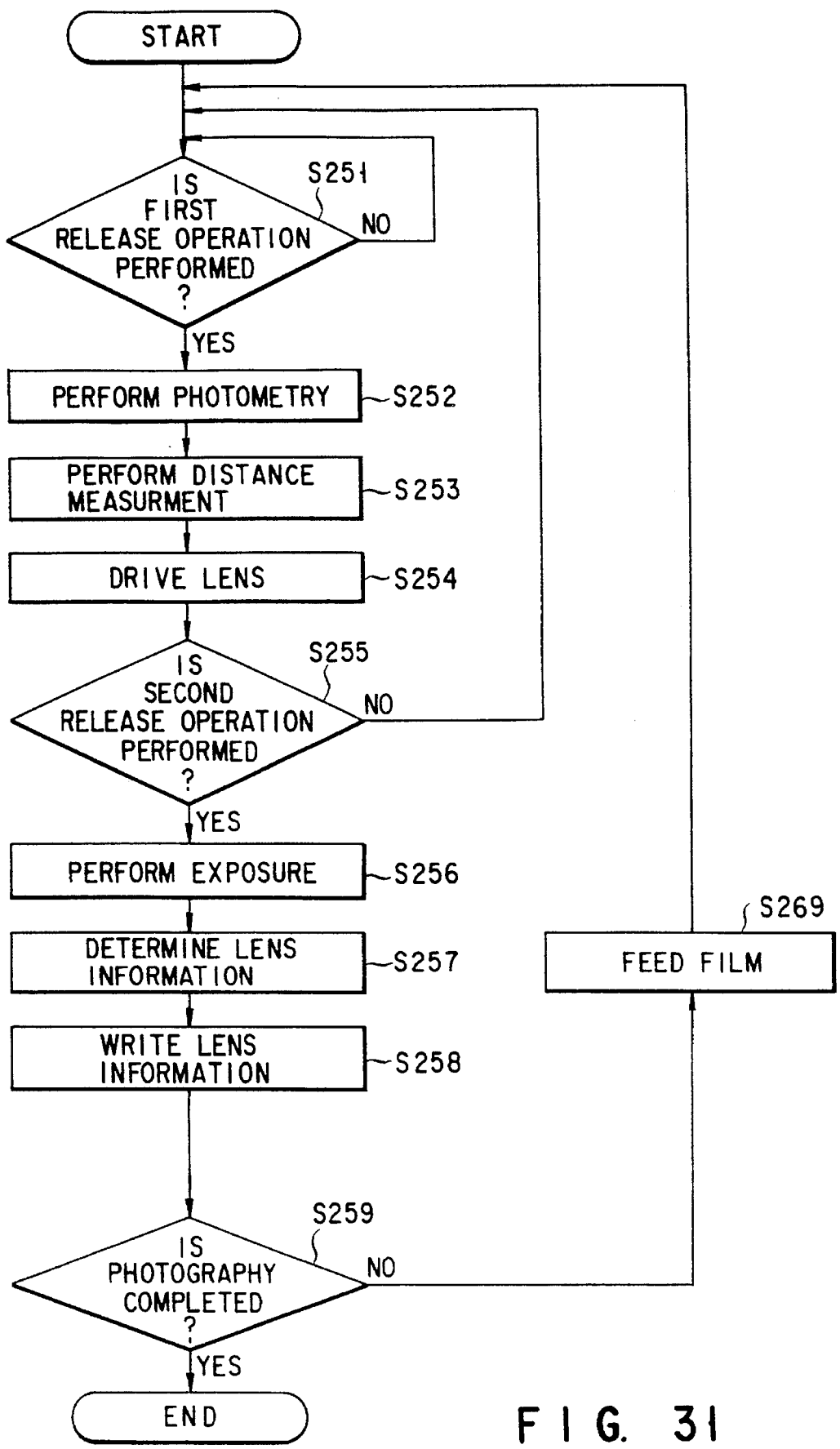
F I G. 31

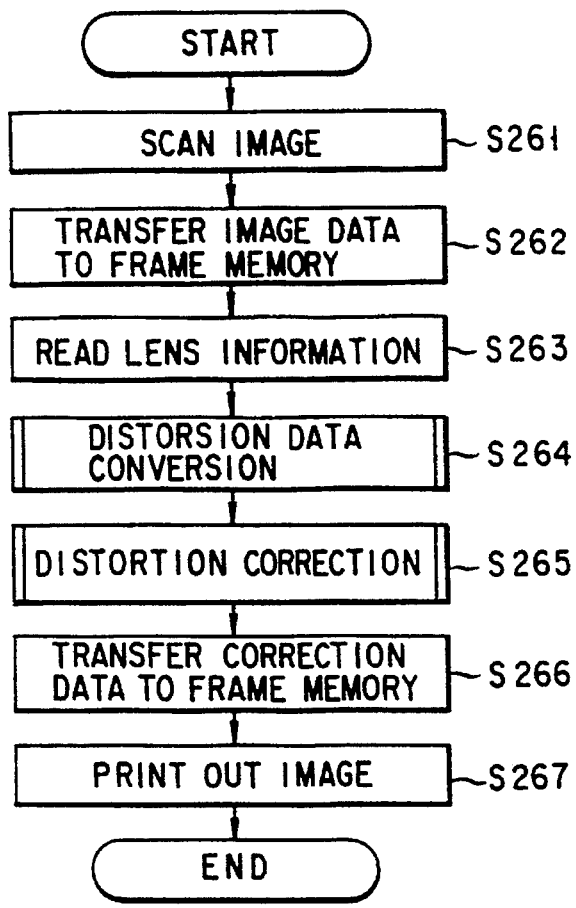
F I G. 32
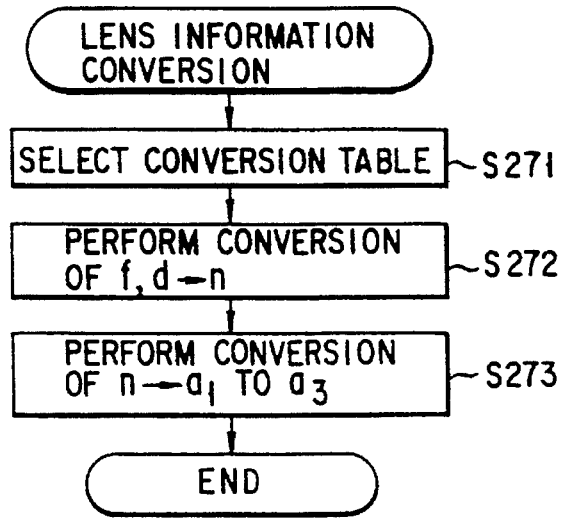
F I G. 33

PHOTOGRAPHING IMAGE CORRECTION SYSTEM

BACKGROUND OF THE INVENTION

1. Field of the Invention

The present invention generally relates to a photographing image correction system and, more particularly, to a photographing image correction system for correcting a degraded image on the basis of information on factors which degrade the photographing image and are inherent in a camera body or a lens, which factors include marginal attenuation and distortion.

2. Description of the Related Art

Conventionally, a camera body and a lens have inherent factors which degrade the quality of photographs, such as aberrations and light amount irregularity. For this reason, techniques of eliminating these degradation factors and correcting degraded images have been developed.

For example, a technique of recording camera shake locus data, obtained in a photographic operation of a camera, on a recording medium and restoring an image without blur in a print process in a laboratory on the basis of the camera shake locus data has been proposed and disclosed in U.S. Ser. No. 62,292 (filing date: May 14, 1993), now U.S. Pat. No. 5,365,303 filed by the same assignee as that of the present invention.

In the technique disclosed in U.S. Ser. No. 62,292 (Jpn. Pat. Appln. KOKAI Publication No. 5-323444), however, the amount of data written on the camera body side becomes large, and hence a large space is required for a recording medium. In addition, according to this technique, since information on a degradation in image quality is written in each camera, recording of data is complicated. This tends to cause a camera failure. Furthermore, in the technique, a relatively high cost is imposed on a user.

In general, the brightness of the lens of a camera is determined by an f-number, which indicates the brightness of an image (the center of the image) formed on the optical axis of the lens. The brightness of a marginal portion of the image with respect to the brightness of the center, i.e., the illuminance of a marginal portion of the image, is called marginal illumination.

When the lens is set in a full-aperture state, this marginal illumination decreases owing to the influences of vignetting and the biquadratic law of cosine. As the f-number increases, since the influence of vignetting disappears, the illuminance decreases owing to the influence of the biquadratic law of cosine. This decrease in illuminance will be referred to as marginal attenuation hereinafter.

A photograph having a dark marginal portion is obtained by marginal attenuation of an image in photography.

In general, the photographing lens system of a camera is basically designed to reduce marginal attenuation.

As a technique of preventing this marginal attenuation, for example, Jpn. Pat. Appln. KOKAI Publication No. 63-26079 discloses a technique of correcting the light amount irregularity of an image by image processing.

It is very difficult to design a certain lens system to always prevent marginal attenuation at an arbitrary lens position and an arbitrary f-number. In addition, in order to correct marginal attenuation, a lens system having a complicated arrangement is required. As a result, both the weight and volume of the camera increase.

Furthermore, a lens generally has different magnifications at different portions. For this reason, a distortion is caused depending on the angle of the optical path of a principal ray of an image which is incident on the lens. This distortion includes a positive distortion (pincushion distortion) and a negative distortion (barrel distortion).

The above-mentioned distortion tends to occur in lens groups having an asymmetrical arrangement. In lens groups having a symmetrical arrangement, a distortion caused in the front lens group is canceled by the rear lens group to become less conspicuous. If, however, a distortion occurs, a photographed image does not become a similar figure of an object to be photographed. That is, a straight line of the photographed image is distorted, and the aberration cannot be reduced by increasing the f-number.

As a technique of correcting such a distortion, for example, a technique of correcting a distorted image by image processing is disclosed in Jpn. Pat. Appln. KOKAI Publication No. 62-230267.

This technique uses data compression. According to the technique, an image photographed by a door camera is converted into a digital signal. When this signal is written in a frame memory, the degree of image compression is sequentially changed, thus displaying a corrected image on a CRT.

More specifically, when a negative distortion occurs, the data compression ratio is sequentially increased, in writing each scanning line data, from the left side of the frame to the center line of the frame, and the compression ratio is sequentially decreased from the center line to the right side. Similarly, the compression ratio in the vertical direction is changed such that the compression ratio is sequentially increased toward the center scanning line, and is sequentially decreased toward the upper and lower ends of the frame.

Such data compression is performed with respect to a photographed image to correct the distorted image into a proper image.

In general, however, instead of using the above-described correction technique, the photographing lens system of a camera is designed to reduce distortion by itself.

Even if the distortion is to be reduced by a photographing lens system itself, since a lens position is limited in terms of structure in many cases, it is very difficult to design the lens system so as to always prevent a distortion at an arbitrary f-number. In addition, in order to correct distortions, a lens system having a complicated arrangement is required. As a result, both the weight and volume of the camera increase.

Furthermore, the correction technique disclosed in Jpn. Pat. Appln. KOKAI Publication No. 62-230267 is suitable for a case wherein an image is photographed and corrected, as an analog or digital image signal, and the corrected image is displayed on a display screen, as in a case of a television camera or a television set. However, in a camera using a film, since an image is optically recorded, the image cannot be optically corrected by using the above correction technique.

SUMMARY OF THE INVENTION

It is, therefore, an object of the present invention to provide a new and improved photographing image correction system which can eliminate defects of the conventional system.

The present invention has been made in consideration of the above situation, and has as its another object to provide a photographing image correction system which facilitates recording on the camera side, and can perform sophisticated correction of a degraded image in accordance with each camera.

It is still another object of the present invention to provide a camera system constituted by a compact, lightweight camera and an image processing unit for obtaining an image without marginal attenuation.

It is still another object of the present invention to provide a camera system constituted by a compact, lightweight camera and an image processing unit for obtaining an image without any distortion.

According to an aspect of the present invention, there is provided a degraded image correction apparatus comprising:
 an image signal output unit for converting an image on a film, which has undergone photography, into an image signal;
 an image storage unit for storing the image signal converted by the image signal output unit;
 a read unit for reading an identification code of a camera which is recorded on the film which has undergone photography;
 an information storage unit for recording the identification code read by the read unit and image quality degradation information in pairs; and
 an image processing unit for reading out the image quality degradation information from the information storage unit in accordance with the identification code read by the read unit, and correcting the image signal stored in the image storage unit by using the read image quality degradation information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a view showing the sizes of an ideal image and an image of a principal ray;

FIG. 6 is a graph showing the relationship between an image height ($Y_0$) and a distortion $D(Y_0)$;

FIG. 7 is a chart showing pixel data, used as light amount irregularity data, in an area equivalent to a film surface;

FIG. 11 is a block diagram showing the detailed arrangement of a camera system according to the second embodiment of the present invention;

FIG. 14A is a graph showing a marginal attenuation curve;

FIG. 14B is a graph showing a marginal attenuation line obtained by connecting arbitrary marginal attenuation data with a polygonal line;

FIG. 15 is a flow chart showing a sequence of marginal attenuation data conversion in FIG. 13;

FIG. 16 is a flow chart for explaining the operation of an image processing unit;

FIG. 17 is a flow chart showing a subroutine for correcting the marginal attenuation of an image by using marginal attenuation data;

FIG. 19 is a flow chart for explaining the operation of an image processing unit in FIG. 18;

FIG. 20 is a flow chart for explaining the operation of the image processing unit in FIG. 18;

FIG. 21 is a flow chart showing a subroutine of marginal attenuation data conversion in FIG. 20;

FIGS. 26A, 26B, and 26C are views, each showing an image obtained when a square grating is distorted;

FIG. 27 is a flow chart showing a sequence of distortion data conversion in FIG. 23;

FIG. 30 is a block diagram showing the arrangement of a camera system according to the fifth embodiment of the present invention;

FIG. 31 is flow chart for explaining the operation of the camera in the camera system shown in FIG. 30;

FIG. 32 is a flow chart for explaining the operation of an image processing unit in FIG. 30; and FIG. 33 is a flow chart showing a subroutine of distortion data conversion in FIG. 32.

DETAILED DESCRIPTION OF THE PREFERRED EMBODIMENTS

Figure 1:
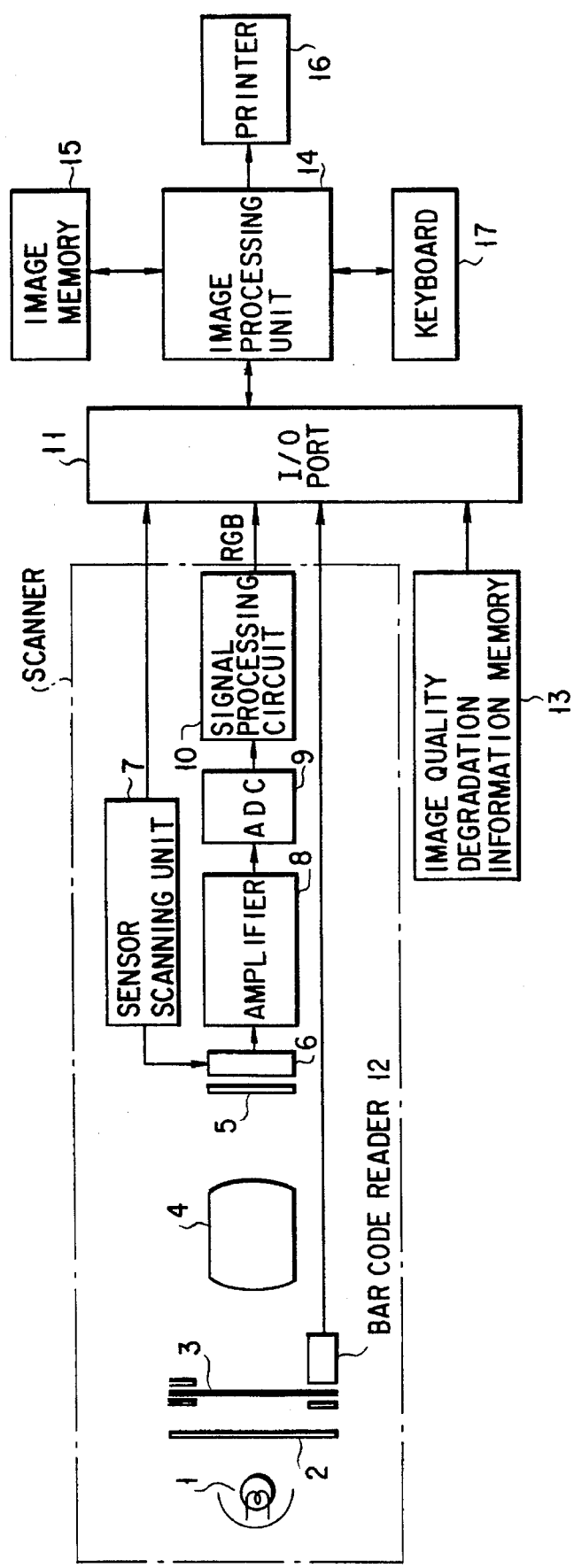
FIG. 1 is a block diagram schematically showing the arrangement of a photographing image correction system according to the first embodiment of the present invention.

Reference will now be made in detail to the presently preferred embodiments of the invention as illustrated in the accompanying drawings, in which like reference characters designate like or corresponding parts throughout the several drawings.

Several embodiments of the present invention will be described below with reference to the accompanying drawings.

FIG. 1 is a schematic block diagram showing the arrangement of a photographing image correction system according to the first embodiment of the present invention. The photographing image correction system of this embodiment is designed to read a bar code which is recorded on a color negative film to identify the type of camera used for a photographic operation, correct a degraded image on the color negative film on the basis of registered image quality degradation information corresponding to the camera indicated by the bar code, and print the corrected image.

Referring to FIG. 1, light from a light source 1 is guided onto a one-dimensional image sensor 6 via a diffusion plate 2, a negative film 3, a lens 4, and a stripe filter 5. The stripe filter 5 is constituted by three separate filters, i.e., red (R), green (G), and blue (B) filters. The one-dimensional image sensor 6 is driven by a sensor scanning unit 7. An output from the one-dimensional image sensor 6 is supplied to an I/O port 11 via an amplifier 8, an A/D converter 9, and a signal processing circuit 10.

In addition to the sensor scanning unit 7, a bar code reader 12, an image quality degradation information memory 13, and an image processing unit 14 are connected to the I/O port 11. In addition, an image memory 15, a printer 16, and a keyboard 17 are connected to the image processing unit 14.

In the photographing image correction system having the above-described arrangement, white light emitted from the light source 1 is diffused by the diffusion plate 2 and illuminates the negative film 3. Light transmitted through the negative film 3 is focused on the one-dimensional image sensor 6 via the lens 4 and the stripe filter 5.

The stripe filter 5 is vertically driven by a linear motor or a PZT vibrator (none are shown) to be moved. Red, green, and blue light components from the filters R, G, and B are respectively output from the one-dimensional image sensor 6 when the stripe filter 5 is moved to the corresponding positions.

When a one-line output signal from the one-dimensional image sensor 6 is read, the image sensor 6 is shifted by the sensor scanning unit 7 by a distance corresponding to one line, thus finally obtaining two-dimensional image data. An output from the image sensor 6 is amplified by the amplifier 8 first and then converted into digital data by the A/D converter 9. The output from the image sensor 6, which has been converted into the digital data, undergoes shading correction, color correction, Δ correction, and the like for correcting the light amount irregularity of the light source, the sensitivity irregularity of each pixel, and the like in the signal processing circuit 10.

The R, G, and B output signals processed by the signal processing circuit 10 are stored in the image memory 15 via the I/O port 11 and the image processing unit 14. The bar code, as camera type identification data, recorded on the film 3 is read by the bar code reader 12 and is stored in the internal memory of the image processing unit 14 via the I/O port 11.

Image quality degradation information corresponding to various types of cameras are stored in the image quality degradation information memory 13. In the image processing unit 14 constituted by a CPU and the like, image quality degradation information corresponding to the type of camera which is read by the bar code reader 12 is selected, and correction processing is performed with respect to a degraded image (to be described later). The corrected image data is output, as an image free from image quality degradation, by the printer 16. Note that the keyboard 17 is used to operate the image processing unit 14.

Figure 2:
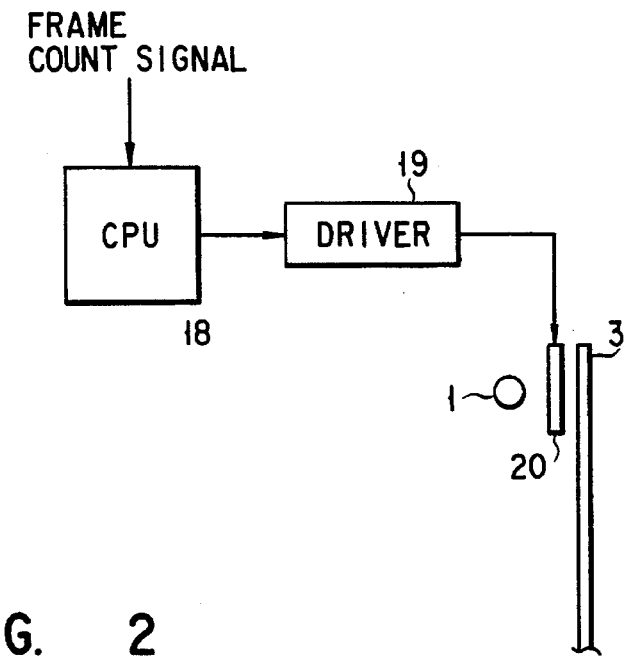
FIG. 2 is a block diagram schematically showing an arrangement for writing a camera type identification code on a film on the camera side.
Figure 3:
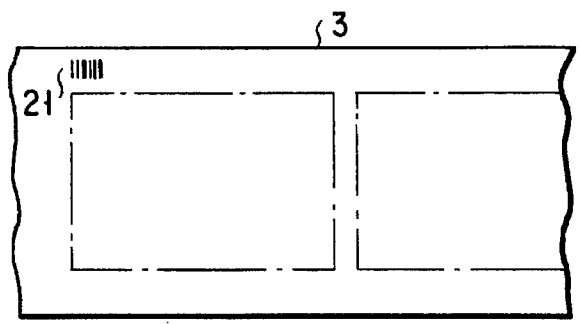
FIG. 3 is a view showing a latent image recorded on a film.

FIG. 2 is a block diagram schematically showing an arrangement for writing a camera type identification code on a film on the camera side. Referring to FIG. 2, bar code data generated by a CPU 18 is supplied to a liquid crystal device 20 by a liquid crystal driver 19. With this operation, the liquid crystal device 20 generates light-transmitting portions and light-shielding portions in accordance with the bar code data, thus recording a bar code latent image 21 shown in FIG. 3. Note that this recording is performed only when a frame count signal input to the CPU 18 represents a frame count "1". Although in this case, a latent image is recorded only when a frame count signal represents a frame count "1", the present invention is not limited to this. For example, a latent image may be recorded when a frame count signal represents the zeroth frame, the final frame, or a certain specific frame. Alternatively, latent images may be recorded on all frames.

In addition, the biquadratic laws of cosine for the respective types of cameras or light amount irregularity data based on flare and distortion data are stored, in pairs, in the image quality degradation information memory 13.

These light amount irregularity data and distortion data will be described next.

Figure 4:
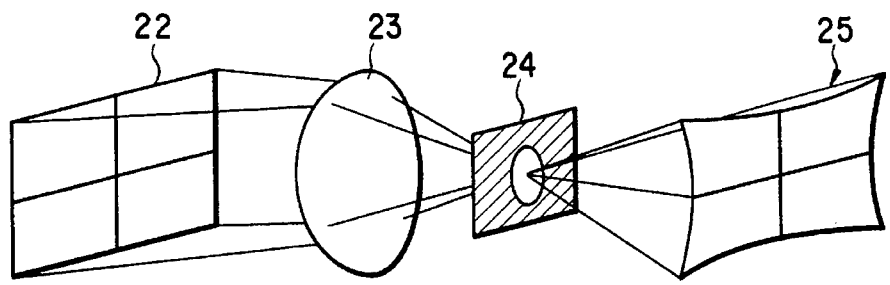
FIG. 4 is a view showing a case wherein a curvature of field occurs.

FIG. 4 shows a state wherein a curvature of field occurs. A rectangular grating 22 on the object side forms an image 25 distorted in the form of a pincushion as shown in FIG. 4, or in the form of a barrel (not shown), through a lens 23 and an aperture stop 24.

In order to calculate the distortion, as shown in FIG. 5, ray tracing of a principal ray emerging from an off-axis object point is performed, and a point at which the principal ray crosses a paraxial image surface at an image boundary is set as a point P. The distance from this point P to an ideal image point $P_0$ is divided by an ideal image size $Y_0$, and the result value is displayed in %. The same calculation is performed regardless of whether the object distance is finite or infinite, and only different equations are used to obtain the size $Y_0$. Therefore, a distortion $D(Y_0)$ is expressed by equation (1)

$$D(Y_0)=\{(Y-Y_0)/Y_0\}\times 100(\%) \quad (1)$$

In this case, if the image height ($Y_0$) and the distortion $D(Y_0)$ are respectively plotted along the ordinate and the abscissa, for example, the graph shown in FIG. 6 is obtained. If distortions are obtained by this technique, and a distortion at an arbitrary point is used as image quality degradation information, the amount of data becomes very large. A method of reducing the amount of data will be described below, in consideration of the fact that the curve of the distortion D is expressed as a function of higher degree of the image height $Y_0$.

In a camera lens whose field angle is not very large, the curve of the distortion D becomes a distortion of third degree and proportional to the square of the image height $Y_0$. Therefore, if the distortion at an image height $c_0$ is represented by $D_0$, $$D(Y_0) = (Y_0/c_0)^2 \cdot D_0 \quad (2)$$

When the distortion $D_0$ at the image height $c_0$ is obtained by equation (2), the distortion $D(Y_0)$ at the arbitrary image height $Y_0$ can be obtained, thus greatly saving the capacity of the memory.

In actual lens design, especially in designing a wide-angle lens or an ultra-wide-angle lens, the distortion $D_0$ becomes a function of higher degree, higher than second degree, of the image height $Y_0$. In this case, recording may be performed by using equation (3) instead of equation (2).

$$D(y_0) = D_0 \sum_{i=1}^{i+1} K_i \left( \frac{y_0}{c_0} \right) \quad (3)$$

where $K_i$ is a coefficient.

Light amount irregularity data is obtained as follows. As shown in FIG. 7, brightness data are discretely extracted from many pixel data in an area 26 equivalent to a film surface, and the extracted data are used as light amount irregularity data.

Figure 8:
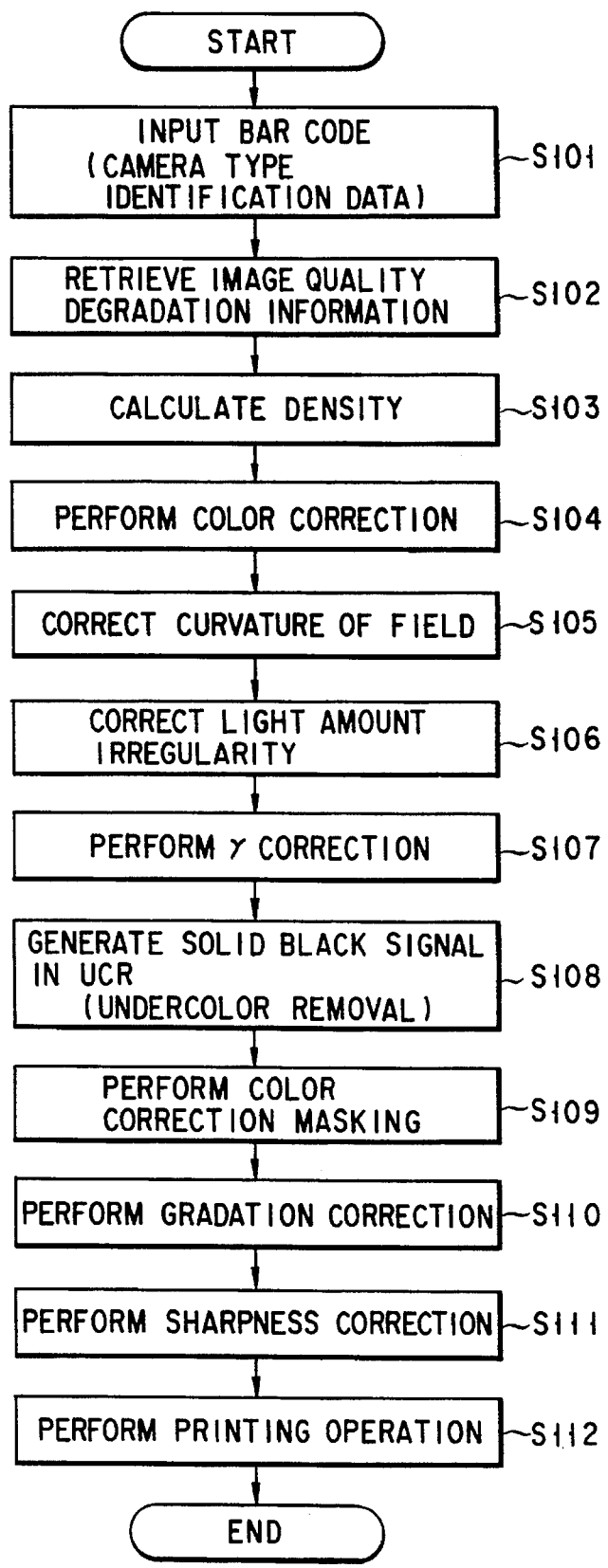
FIG. 8 is a flow chart for explaining an image correction processing operation of an image processing unit in FIG. 1.

Image correction processing performed by the image processing unit 14 shown in FIG. 1 will be described next with reference to the flow chart of FIG. 8.

First, in step S101, bar code data as camera type identification data is input. In step S102, curvature of field data and light amount irregularity data which are registered in advance and correspond to the camera indicated by the bar code are retrieved. After this retrieval, the density of the print is calculated on the basis of the average brightness of the image in step S103.

In step S104, color correction is performed by an LATD scheme (large area transmission density scheme). In step S105, correction of the curvature of field is performed. As described above, only the image height $c_0$ and the distortion $D_0$ at that position constitute information associated with the distortion. If, however, a distortion of third degree or an aberration of higher degree is added, the coefficient $K_i$ is added, as shown in equation (3). A distortion will be described hereinafter. A distortion is an aberration in which a spatial coordinate system is expanded or contracted in the form of a pincushion or of a barrel. Therefore, the aberration correction may be realized by expanding or contracting the space.

Figures 9A, 9B:
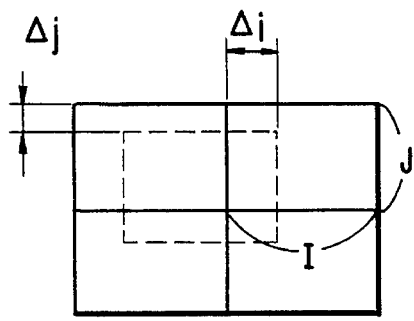
FIG. 9A is a view showing four pixels constituting an image.
FIG. 9B is a view showing the relationship between the position of a pixel in FIG. 9A and the ideal position of a corrected pixel (i,j)
Figure 10:
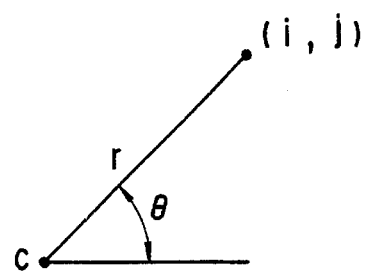
FIG. 10 is a view showing the relationship between a line segment connecting the pixel (i,j) and the frame center (distortion=0) and the row direction of pixels (i direction)

FIG. 9A shows four pixels constituting an image. Letting r be the image height at the center of a pixel (i,j), and $r_0$ be the ideal height without any distortion, a distortion $D(r_0)$ is represented as follows according to equation (2):

$$D(r_0) = (r_0/c_0)_2 \cdot D_0 \quad (4)$$

According to equations (1) and (4), $$r = r_0 \left\{ 1 + \frac{1}{100} \left( \frac{r_0}{c_0} \right)^2 \cdot D_0 \right\} \quad (5)$$

Since the values r, $c_0$, and $D_0$ are known, the ideal height $r_0$ can be obtained from equation (5). Since equation (5) is a cubic equation for the ideal height $r_0$, it takes much time to obtain solutions. For this reason, the ideal image height $r_0$ may be obtained by performing approximation with respect to $D(r_0)$ and $D(r)$ because $r_0$ and r are approximate to each other. An absolute amount $\Delta r$ of the distortion is expressed by $$\Delta r = r - r_0 \quad (6)$$

Letting $\theta$ be the angle defined by a line segment connecting the pixel (i,j) to a frame center (distortion=0) c and the row direction of the pixels (i direction), a distortion $\Delta i$ in the i direction is given by $$\Delta i = \Delta r \cos \theta \quad (7)$$

Distortion $\Delta j$ in the column direction of the pixels (j direction) is given by $$\Delta j = \Delta r \sin \theta \quad (8)$$

As a result, the ideal position of the corrected pixel (i,j) becomes the position indicated by the broken line in FIG. 9B. Assume that the image signal corrected to the position indicated by the broken line in FIG. 9B contributes as signals of pixels (i,j), (i+1,j), (i,j+1), and (i+1,j+1) in proportion to their areas:

$$\left. \begin{array}{l} (I - \Delta i) \times (J - \Delta j) \times D_{i,j} a \text{ as pixel signal } (i,j) \\ \Delta i \times (J - \Delta j) \times D_{i,j} \text{ as pixel signal } (i+1,j) \\ (I - \Delta i) \times \Delta j \times D_{i,j} \text{ as pixel signal } (i,j+1) \\ \Delta i \times \Delta j \times Di,j \text{ as pixel signal } (i+1,j+1) \end{array} \right\} \quad (9)$$

where $D_{i,j}$ is the brightness of the pixel (i,j) before correction.

The above calculation is performed with respect to all the pixels. Outputs corresponding to the respective pixels after correction are obtained as the sum of brightness values contributed by the pixels represented by formulae (9).

When the correction of the curvature of field is completed in step S105, correction of light amount irregularity is performed in step S106. Light amount irregularity data is recorded as discrete information on the brightness of a film surface which is obtained when the diffusion plate 2 having uniform brightness is photographed.

Assume that this light amount irregularity data is information which is normalized with a value at the center of the film surface being set as "1". When light amount irregularity at an arbitrary position $a_{ij}$ is represented by $a_{ij}$, and an image data output at that position is represented by $D_{ij}$, a corrected image data output $D_{ij}'$ is represented as follows:

$$D_{ij}' = D_{ij}/a_{ij} \quad (10)$$

Since the obtained light amount irregularity data is discrete data, it is assumed that light amount irregularity data at an intermediate position can be obtained by linear interpolation. With the above-described processing, light amount irregularity is corrected with respect to all the image data $D_{ij}$.

When the correction of the light amount irregularity is completed in this manner, a reflectivity-voltage linear signal (BGR) is converted into a density-voltage linear signal (YMC) by a γ correction section in step S107. Thereafter, in step S108, a solid black signal is generated in a gray component (called undercolor removal: UCR) in a tricolor signal.

In step 109, color correction masking is performed by using a predetermined masking equation. After gradation correction such as contrast correction is performed in step S110, sharpness correction such as edge emphasis processing or smoothing is performed in step S111. In step S112, the image data which has undergone the above-described digital signal processing is supplied to the printer 16 to be printed out.

In the above-described embodiment, a bar code is used as a code for identifying the type of camera. However, the present invention is not limited to this. For example, a magnetic recording portion may be formed on a film, and code data for identifying the type of camera may be recorded on this magnetic recording portion.

As described above, according to the first embodiment of the present invention, there is provided a photographing image correction system which facilitates a recording operation on the camera side, and can perform sophisticated correction of a degraded image in accordance with each type of camera. Since only a camera type identification code needs to be recorded, as data, on the camera side, a recording operation on the camera side is facilitated, and the recording space can be saved. On the laboratory side, since limitations on storage capacity are less than those on the camera side, detailed degradation information can be registered to allow more sophisticated correction of a degraded image.

The second embodiment of the present invention will be described in detail next with reference to the accompanying drawings.

Figure 12:
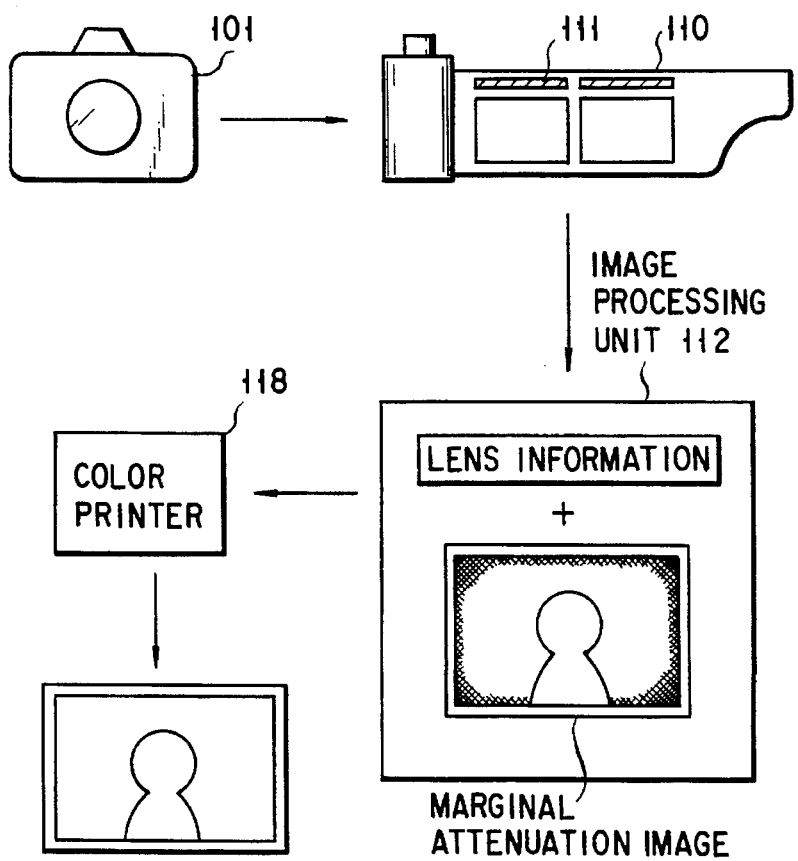
FIG. 12 is a block diagram showing the flow of information in the camera system and its schematic arrangement according to the second embodiment of the present invention.

FIGS. 11 and 12 show the arrangement of a camera system according to the second embodiment of the present invention.

FIG. 12 shows the flow of information in a camera system of the present invention and its schematic arrangement. This camera system comprises a cameral 101 capable of recording marginal attenuation data of a lens in a photographic operation, a cameral 101 having a magnetic tape 111 for recording information, an image processing unit 112 capable of reading the information, and a color printer 118 for printing out a color image.

FIG. 11 shows the detailed arrangement of the camera system.

In the camera system, the camera 101 comprises a lens 103, a driving section 104, a ROM 105, a distance measuring section 106, an exposure control section 107, a release button 108, a marginal attenuation data write section 109, and a CPU 102. The focal length and focus position of the lens 103 are variable. The driving section 104 serves to change the focal length and focus position of the lens 103. The marginal attenuation data of the lens 103 is stored in the ROM 105 in advance. The distance measuring section 106 measures a distance to an object to be photographed. The exposure control section 107 measures the brightness of the object and controls an exposure operation. The marginal attenuation data write section 109 serves to record marginal attenuation data, obtained in a photographic operation, on the magnetic tape 111. The CPU 102 controls the driving section 104, the ROM 105, the distance measuring section 106, the exposure control section 107, and the marginal attenuation data write section 109.

The image processing unit 112 comprises a marginal attenuation data read section 114, a film scanner 115, a frame memory 116, a CPU 113, and a frame memory 117. The marginal attenuation data read section 114 serves to read the marginal attenuation data recorded on the magnetic tape 111. The film scanner 115 reads an image from a film 110. The frame memory 116 serves to store the image read by the film scanner 115. The CPU 113 controls the film scanner 115 and the marginal attenuation data read section 114. The frame memory 117 serves to store an image obtained by marginal attenuation correction performed by the CPU 113. The corrected image data stored in the frame memory 117 is printed out by a color printer 118.

The operation of the camera 101 in the camera system having the above-described arrangement will be described next with reference to the flow chart of FIG. 13.

First, the sequence is started by turning on the main switch (not shown) of the camera 101. It is then checked whether a first release operation is performed by a photographer (step S1). If it is determined that the operation is performed (YES), photometry is performed by the exposure control section 107 (step S2), and distance measurement is performed by the distance measuring section 106 (step S3).

An aperture value (f-number) is determined upon reception of the distance measurement result, and the lens is driven by the driving section 104, thus completing an automatic focusing operation (step S4).

Subsequently, it is checked whether a second release operation is performed by the photographer (step S5). If it is determined that the operation is performed (YES), an exposure operation is performed with the aperture lens position determined in steps S2 to S4 (step S6). Lens information (focal length, focus position, and aperture value) in a photographic operation is determined by the CPU 102 (step S7)). The lens information is converted into marginal attenuation data by using data in the ROM 105 incorporated in the lens (step S8).

The marginal attenuation data is written on the magnetic tape 111 by the marginal attenuation data write section 109 (step S9). It is checked whether the photographer finishes the photographic operation (step S10). If it is determined that the photographic operation is to be continued (NO), the film is fed (step S11), and the flow returns to step S1. If it is determined that the photographer finishes the photographic operation (YES), the sequence is ended.

Marginal attenuation required for marginal attenuation data conversion in step S8 will be described below.

Letting b be an actual image brightness value on a film surface, and b' be an ideal image brightness value, a magnitude D of marginal attenuation is represented by equation (11):

$$D=(b-b')/b' \times 100(\%) \tag{11}$$

Assume that the marginal attenuation is a function of an image height. In this case, if an actual image height z and the marginal attenuation D are respectively plotted along the abscissa and the ordinate, the marginal attenuation curve shown in FIG. 14A is obtained. In this embodiment, in order to minimize the capacity of the ROM 105, marginal attenuation data are limited to five points indicated on the curve in FIG. 14A, and approximation is performed, in practice, by using a marginal attenuation line constituted by a polygonal line connecting the marginal attenuation data at the five points, as shown in FIG. 14B.

The detailed format of marginal attenuation data in the ROM 105 will be described next.

The ROM 105 has two tables like Tables 1 and 2 in accordance with various types of lenses and their aperture values.

TABLE 1

| f (mm) | d (m) | | |
|---|---|---|---|
| | 0.5–0.7 | 0.7–1.5 | 1.5–∞ |
| 28–35 | 0 | 1 | 2 |
| 35–50 | 3 | 4 | 5 |
| 50–70 | 6 | 7 | 8 |

TABLE 2

| n | $D_1$ | | $D_2$ | | $D_3$ | | $D_4$ | | $D_5$ | |
|---|---|---|---|---|---|---|---|---|---|---|
| | D | b | D | b | D | b | D | b | D | b |
| 0 | −1.0 | 0.4 | −2.0 | 0.6 | −3.0 | 0.8 | −4.0 | 0.9 | −5.0 | 1.0 |
| 1 | −1.0 | 0.4 | −2.0 | 0.6 | −3.0 | 0.8 | −3.8 | 0.9 | −4.5 | 1.0 |
| 2 | −1.0 | 0.4 | −2.0 | 0.6 | −3.0 | 0.8 | −3.7 | 0.9 | −4.3 | 1.0 |
| 3 | −0.6 | 0.4 | −0.7 | 0.6 | −1.0 | 0.8 | −1.6 | 0.9 | −2.5 | 1.0 |
| 4 | −0.5 | 0.4 | −0.6 | 0.6 | −0.7 | 0.8 | −1.2 | 0.9 | −2.2 | 1.0 |
| 5 | −0.4 | 0.4 | −0.5 | 0.6 | −0.7 | 0.8 | −1.0 | 0.9 | −2.0 | 1.0 |
| 6 | −0.2 | 0.4 | −0.3 | 0.6 | −0.5 | 0.8 | −0.7 | 0.9 | −1.0 | 1.0 |
| 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |

In Table 1, pieces of lens information (focal lengths f and focus positions d) determined by the CPU 102 are classified into nine groups. In general, even the marginal attenuation of the same lens changes depending on the focal length and the focus position. Therefore, the marginal attenuation data must be changed in accordance with the focal length and the focus position. This classification is performed in consideration of the change ratio of marginal attenuation with respect to the focal length and the focus position. That is, finer classification is performed as the change in marginal attenuation increases, and vice versa. Table 2 is a conversion table for converting lens information n grouped in Table 1 into marginal attenuation data $D_1$ to $D_5$.

FIG. 15 is a flow chart showing the sequence of a subroutine "marginal attenuation data conversion", in which the marginal attenuation data obtained in step S8 is converted, and the data is read out from the ROM 105.

Figure 13:
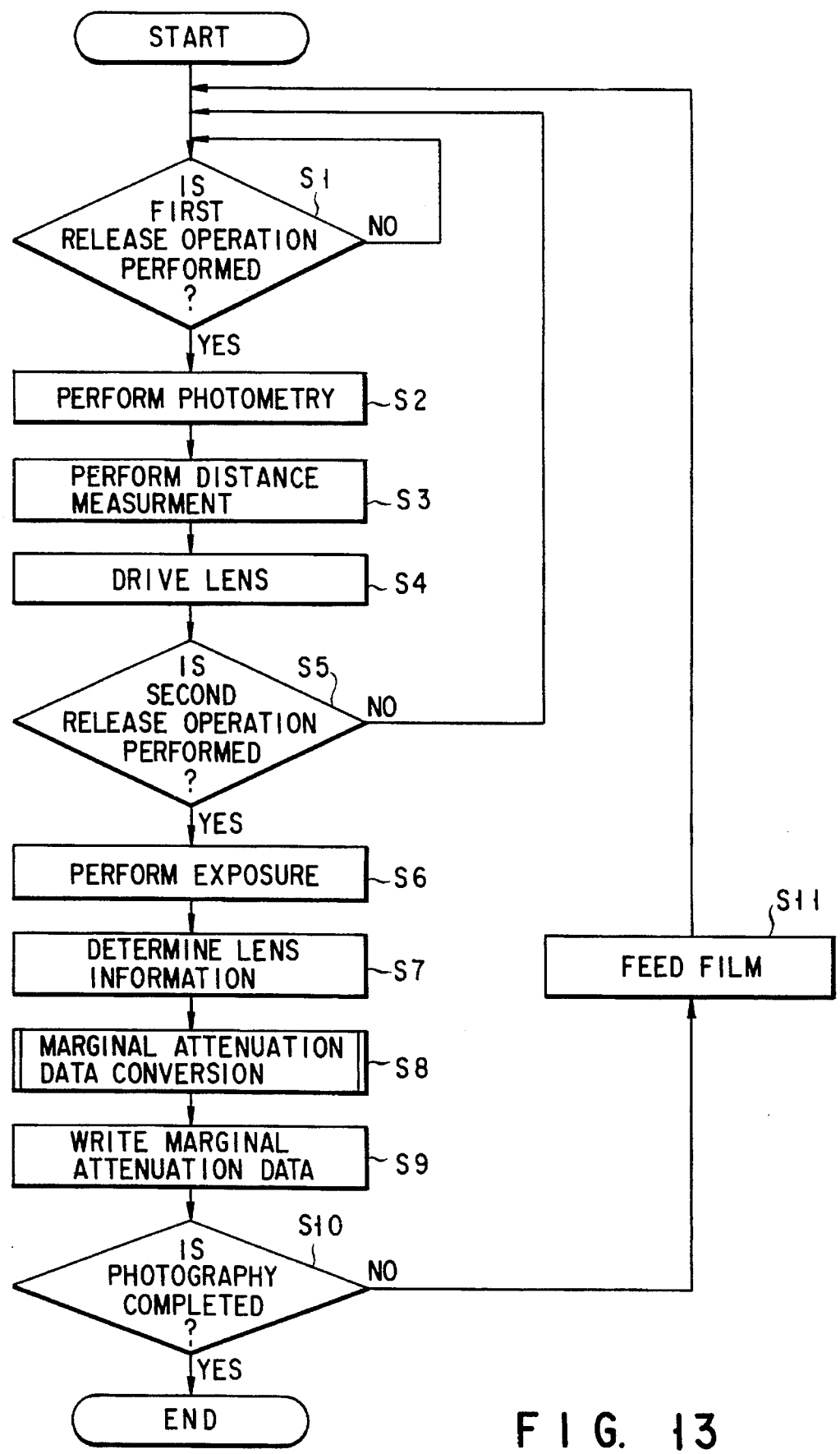
FIG. 13 is a flow chart for explaining the operation of the camera operation in the camera system shown in FIG. 11.

After the sequence is started, a proper conversion table is selected from a plurality of conversion tables stored in the ROM 105 in accordance with "lens type" and "aperture value" of the lens information determined in step S7 in FIG. 13 (step S21).

The focal length f and the focus position d of the lens information in the photographic operation are grouped according to Table 1 (step S22). The grouped lens information n is converted into the marginal attenuation data $D_1$ to $D_5$ in accordance with Table 2 as the conversion table (step S23). The sequence is then completed.

The operation of the image processing unit 112 will be described below with reference to the flow chart of FIG. 16. The same reference numerals in the following description denote the same parts as in FIG. 11.

After the sequence is started, an image recorded on the film 110 is read by the film scanner 115 (step S31), and is transferred to the frame memory 116 (step S32).

The marginal attenuation data recorded on the magnetic tape 111 is read by the marginal attenuation data read section 114 (step S33). The marginal attenuation of the image stored in the frame memory 116 is corrected by the CPU 113 using the read marginal attenuation data (step S34). The resultant data is transferred to the frame memory 117 (step S35). The corrected image is then output by the color printer 118 (step S36), and the sequence is completed.

The marginal attenuation correction in step S34 shown in FIG. 16 will be described below with reference to the flow chart of FIG. 17 which shows a subroutine for correcting the marginal attenuation of the image by using the marginal attenuation data.

After the sequence is started, it is checked whether all the marginal attenuation data $D_1$ to $D_5$ are "0"(step S41). If it is determined that all the data are "0"(YES), no marginal attenuation correction is performed, and the sequence is completed. If, however, it is determined that at least one of the data $D_1$ to $D_5$ is not "0"(NO), a correction value is calculated (step S42), and the sequence is completed.

The correction calculation in step S42 shown in FIG. 17, i.e., a detailed marginal attenuation correction method, will be described next.

When the marginal attenuation data $D_1$ to $D_5$ are given, an approximate curve of the marginal attenuation is obtained. This curve represents the ratio of the marginal attenuation of the actual height to the ideal height, as indicated by equation (11). Equation (11) is solved with respect to the ideal brightness b', as follows:

$$b' = (1 + D/100)b \quad (12)$$

That is, the ideal brightness b' can be obtained by multiplying the actual brightness b by (1+D/100).

In this embodiment, an image is read from the film 110. The read image is converted into a discrete digital image. In this case, the actual image height z corresponds to a pixel located at a place separated from the center of the image by a distance z. Therefore, the marginal attenuation may be corrected by a substitution of the brightness b obtained by equation (12) into the brightness b of the pixel of interest which is separated from the center of the image by the distance z.

With the above-described arrangement, marginal attenuation correction need not be performed by the photographing lens itself, thereby simplifying the lens arrangement. In addition, marginal attenuation correction can be performed at an arbitrary focal length and an arbitrary focus position. Therefore, a photographing image with higher quality can be provided.

Figure 18:
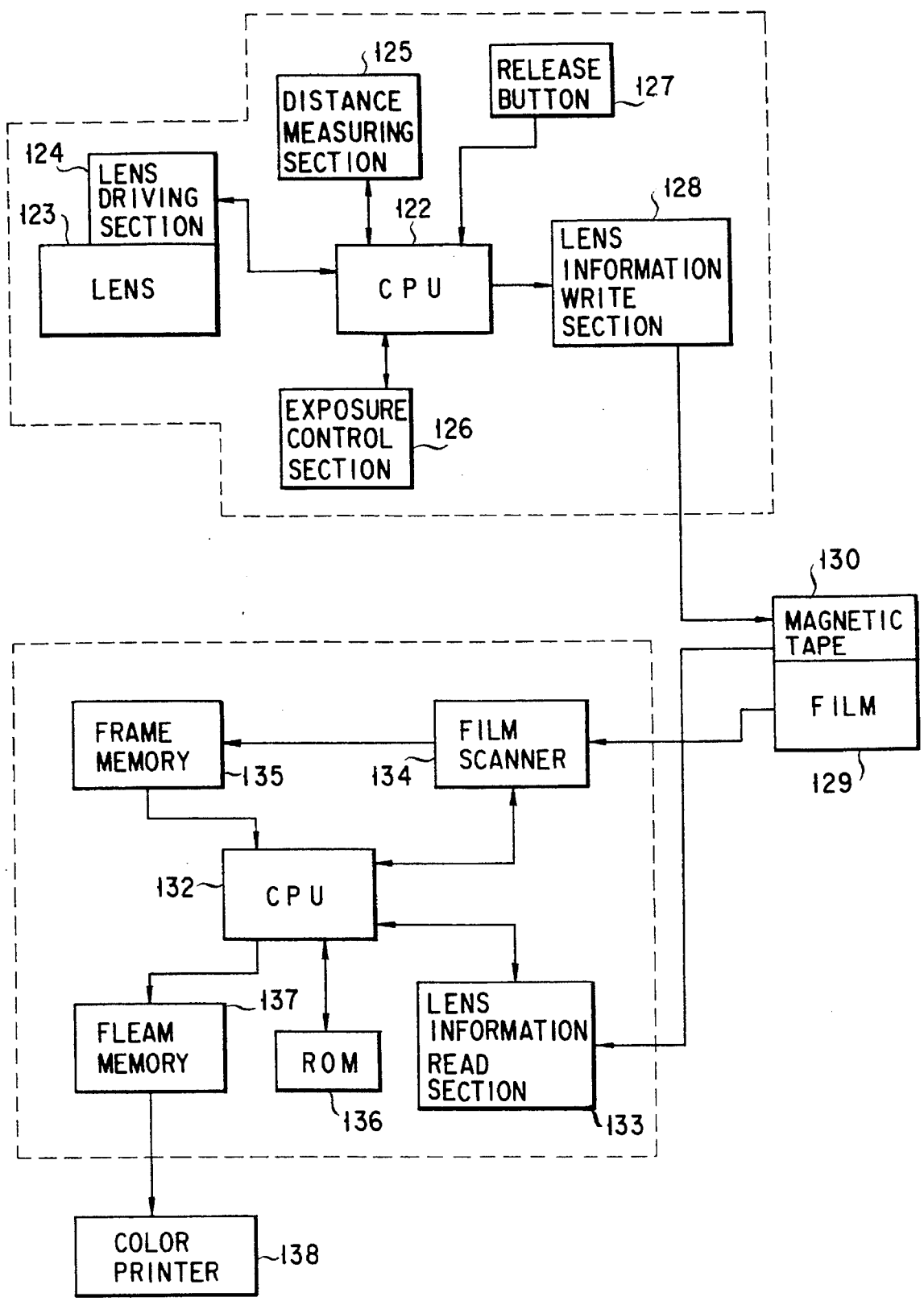
FIG. 18 is a block diagram showing the arrangement of a camera system according to the third embodiment of the present invention.

FIG. 18 shows the arrangement of a camera system according to the third embodiment of the present invention.

Similar to the second embodiment, this camera system comprises a camera 121 capable of recording marginal attenuation data of a lens in a photographic operation, a film 129 having a magnetic tape 130 for recording information, an image processing unit 131 for reading the information, and a color printer 138 for outputting a corrected image.

The arrangement of the third embodiment is different from that of the second embodiment in the following points. First, the third embodiment has no component equivalent to the ROM 105 in the second embodiment. Second, the marginal attenuation data write section 109 and the marginal attenuation data read section 114 are replaced with a lens information write section 128 and a lens information read section 133, respectively. Lastly, a ROM 136 is incorporated in the image processing unit 131. Note that the ROM 136 serves to store marginal attenuation data corresponding to a plurality of lenses used in a photographic operation.

The operation of the camera 121 of the camera system of the third embodiment will be described next with reference to the flow chart of FIG. 19.

First of all, the sequence is stated by turning on the main switch of the camera 121. It is then checked whether a first release operation is performed by a photographer (step S51). If it is determined that the operation is performed (YES), photometry is performed by an exposure control section 126 (step S52), and distance measurement is performed by a distance measuring section 125 (step S53).

An aperture value is determined upon reception of the distance measurement result, and a lens 123 is driven by a lens driving section 124. With this operation, an automatic focusing operation is completed (step S54).

Subsequently, it is checked whether a second release operation is performed by the photographer (step S55). If it is determined that the operation is performed (YES), an exposure operation is performed with the aperture lens position determined in steps S52 to S54 (step S56). Thereafter, lens information (lens type, focal length, focus position, and aperture value) in a photographic operation is determined by a CPU 122 (step S57). The lens information is then written on the magnetic tape 130 by the lens information write section 128 (step S58).

Subsequently, it is checked whether the photographer finishes the photographic operation (step S59). If it is determined that the photographer continues the photographic operation (NO), the film is fed (step S60), and the flow returns to step S51. If it is determined that photographer finishes the photographic operation, the sequence is ended.

The operation of the image processing unit 131 will be described next with reference to the flow chart of FIG. 20.

After the sequence is started, an image recorded on a film 129 is read by a film scanner 134 (step S61), and is transferred to a frame memory 135 (step S62).

The lens information recorded on the magnetic tape 130 is read by the lens information read section 133 (step S63). The lens information is converted into marginal attenuation data by a CPU 132 using the data stored in the ROM 136 (step S64). The marginal attenuation of the image stored in the frame memory 135 is corrected by using the converted marginal attenuation data (step S65).

The corrected image is then transferred to a frame memory 137 (step S66). The corrected image is printed out by a color printer 138 (step S67), and the sequence is completed.

FIG. 21 is a flow chart in step S64 of FIG. 20, i.e., a subroutine for marginal attenuation data conversion.

This marginal attenuation data conversion will be described below. After the sequence is started, a proper conversion table is selected from a plurality of conversion tables stored in the CPU 132 in accordance with "lens type" and "aperture value" of the read lens information (step S71). Thereafter, "focal length" and "focus position" of the read lens information in a photographic operation are grouped in accordance with the conversion table selected in step S71 (step S72). Grouped lens information n is converted into marginal attenuation data $D_1$ to $D_5$ (step S73), and the sequence is ended.

In the second and third embodiments of the present invention, marginal attenuation data is represented by five data. However, marginal attenuation data may be represented by a larger or smaller number of data. In addition, a marginal attenuation curve may be developed into a power series, and its coefficients may be determined by marginal attenuation data.

With the above-described arrangements of the second and third embodiments of the present invention, the marginal attenuation of an image is corrected by using information on each frame in a photographic operation. Therefore, an image whose marginal attenuation is corrected at an arbitrary focal length and an arbitrary focus position can be obtained. Furthermore, in this embodiment, lens information on marginal attenuation data is recorded in units of frames. However, such information may be temporarily recorded on a recording medium such as a semiconductor memory, and the information may be collectively recorded in a film rewind operation upon completion of a photographic operation.

As described in detail above, according to the second and third embodiments of the present invention, there is provided a camera system which does not require the photographic lens to correct marginal attenuation, and can obtain an image without marginal attenuation by using a compact, lightweight camera having a simple lens arrangement.

The fourth embodiment of the present invention will be described in detail below with reference to the accompanying drawings.

Figure 22:
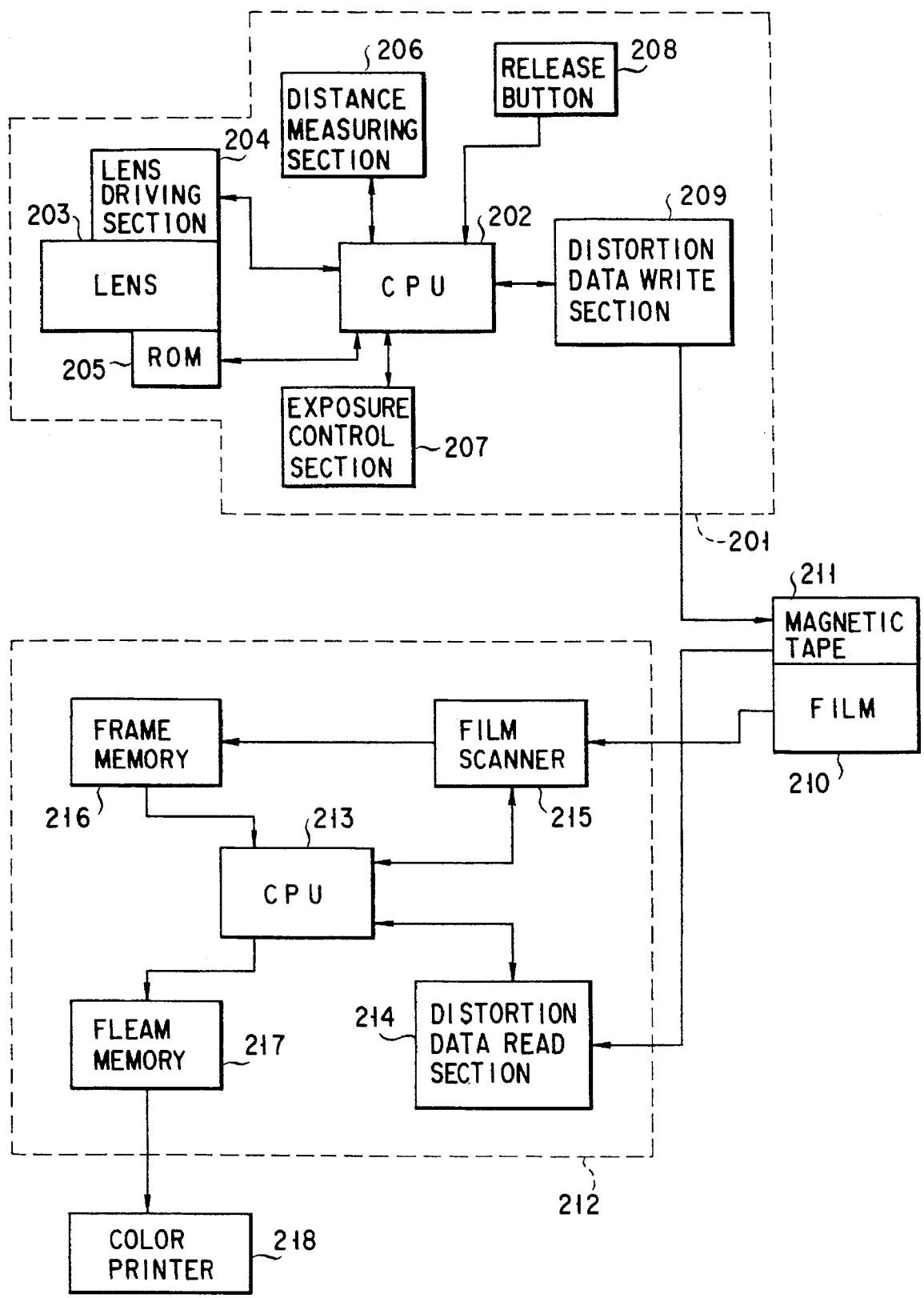
FIG. 22 is a block diagram showing the schematic arrangement of a camera system according to the fourth embodiment of the present invention.

FIG. 22 is a block diagram showing a schematic arrangement of a camera system according to the fourth embodiment of the present invention.

This camera system is roughly constituted by a camera 201 capable of recording distortion data of the lens in a photographic operation, a film 210 having a magnetic tape 211 for recording the distortion data and designed to record an optical image, an image processing unit 212 for reading information constituted by the distortion data and the optical image, and a color printer 218 for printing out color image data.

The camera 201 comprises a lens 203, a lens driving section 204, a ROM 205, a distance measuring section 206, an exposure control section 207, a release button 208, a distortion data write section 209, and a CPU 202. The focal length and focus position of the lens 203 are variable. The lens driving section 204 serves to change the focal length and focus position of the lens 203. The ROM 205 serves to store the distortion data of the lens 203 in advance. The distance measuring section 206 measures a distance to an object to be photographed. The exposure control section 207 measures the brightness of the object and controls an exposure operation. The distortion data write section 209 serves to record the distortion data, obtained in the photographic operation, on the magnetic table 211. The CPU 202 controls the lens driving section 204, the ROM 205, the distance measuring section 206, the exposure control section 207, and the distortion data write section 209.

The image processing unit 212 comprises a distortion data read section 214, a film scanner 215, a frame memory 216, a CPU 213, and a frame memory 217. The distortion data read section 214 reads the distortion data recorded on the magnetic table 211. The film scanner 215 reads an image from the film 210. The frame memory 216 serves to store the image read by the film scanner 215. The CPU 213 controls the film scanner 215 and the distortion data read section 214. The frame memory 217 serves to store an image whose distortion is corrected by the CPU 213.

The operation of the film 210 in the camera system will be described next with reference to the flow chart of FIG. 23.

First of all, the sequence is started by turning on the main switch (not shown) of the camera 201. It is then checked whether a fast release operation is performed by a photographer (step S201). If it is determined that the operation is performed (YES), photometry is performed by the exposure control section 207 (step S202), and distance measurement is performed by the distance measuring section 206 (step S203).

An aperture value is determined upon reception of the distance measurement result, and the lens is driven by the lens driving section 204, thus completing an automatic focusing operation (step S204).

Subsequently, it is checked whether a second release operation is performed by the photographer (step S205). If it is determined that the operation is performed (YES), an exposure operation is performed with the aperture lens position determined in steps S202 to S204 (step S206). Lens information (focal length, focus position, and aperture value) in the photographic operation is determined by the CPU 202 (step S207), and the lens information is converted into distortion data by using data in the ROM 205 incorporated in the lens (step S208).

The converted distortion data is then written on the magnetic table 211 by the distortion data write section 209 (step S209). It is further checked whether the photographer finishes the photographic operation (step S210). If it is determined that the photographic operation is to be continued (NO), the film is fed (step S211), and the flow returns to step S201. If, however, it is determined that the photographer finishes the photographic operation (YES), the sequence is ended.

Distortion data required for the distortion data conversion in step 208 will be described below.

Figure 24:
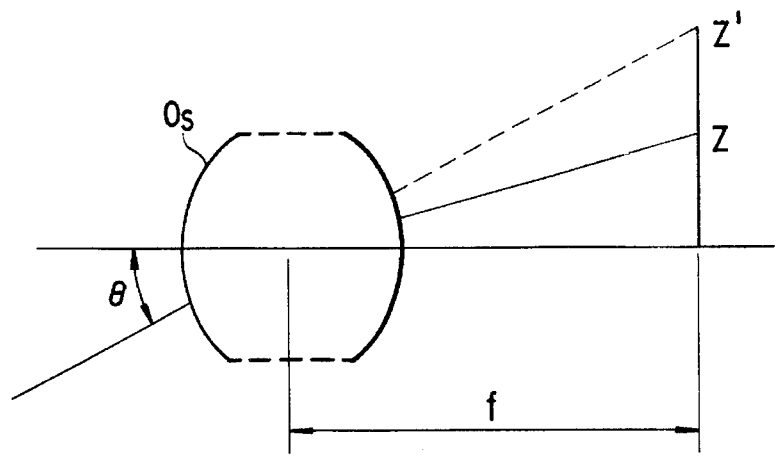
FIG. 24 is a chart showing an aberration of light incident on an optical system Os at an angle i.

FIG. 24 shows a distortion of light which is incident on an optical system Os at an angle θ. An image having an actual image height z which is influenced by the distortion with respect to an ideal image height z' is formed on the optical axis separated from the optical system Os by a focal length f. In this case, a magnitude a of the distortion is expressed by equation (13):

$$a=(z-z')/z \times 100(\%) \tag{13}$$

In this case, the ideal image height z' is given by equation (14):

$$z'=f \cdot \tan(\theta) \tag{14}$$

In general, an aberration of an optical system is a function of an image height.

Figures 25A, 25B:
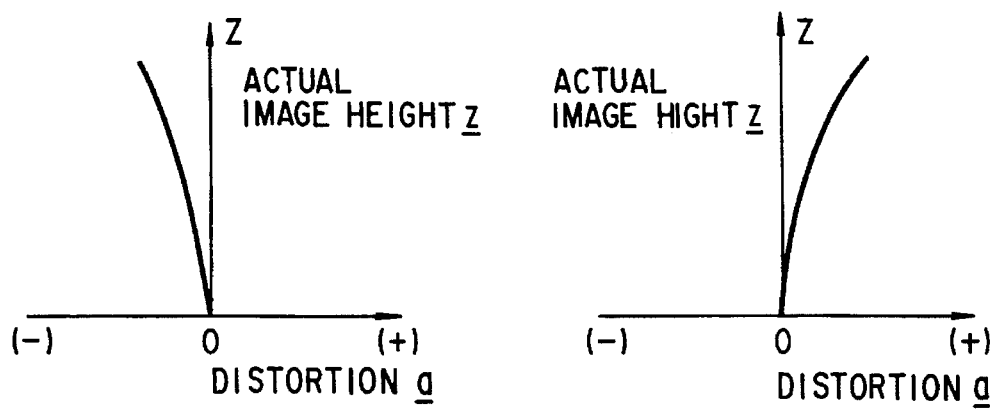
FIGS. 25A, 25B, and 25C are graphs showing distortion curves with an actual image height z and a distortion a being respectively plotted along the abscissa and the ordinate.
Figure 25C:
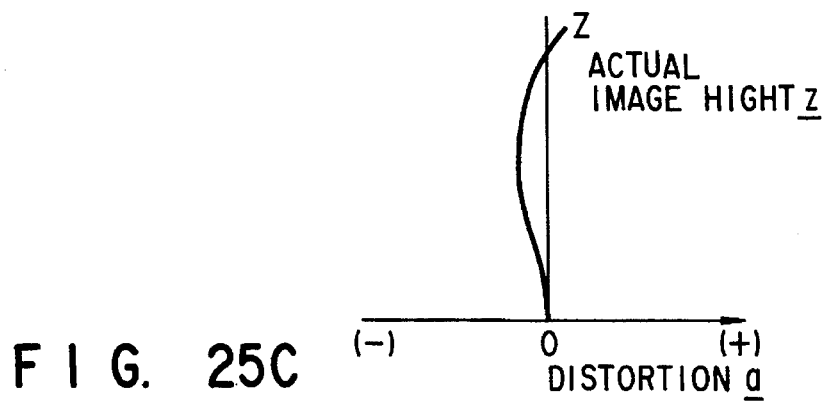

FIGS. 25A, 25B, and 25C respectively show distortion curves, each obtained when the actual image height z and the distortion a are respectively plotted along the abscissa and the ordinate. FIGS. 26A, 26B, and 26C respectively show images obtained when a square grating is distorted. The distortion shown in FIG. 26A called barrel distortion; the distortion in FIG. 26B, pincushion distortion; and the distortion in FIG. 26C, wavy distortion. FIGS. 25A, 25B, and 25C respectively correspond to FIGS. 26A, 26B, and 26C. In this case, these distortion curves are developed as indicated by equation (15):

$$a(z)=a1z+a2z^2+a3z^3+a4z^4+ \tag{15}$$

With this development, if development coefficients a1, a2, a3, a4, . . . in equation (15) are used as aberration data, aberration curves like those shown in FIGS. 25Aa, 25B, and 25C can be reproduced. Therefore, a series of these coefficients a1, a2, a3, a4, . . . are used as distortion data. Note that in this embodiment, distortion data is constituted by only the three coefficients a1, a2, and a3 to minimize the capacity of the ROM 205 and shorten the time taken by the CPU 213 to calculate for distortion correction.

The detailed format of distortion data in the ROM 205 will be described next with reference to Tables 3 and 4.

The ROM 205 has two tables like Tables 3 and 4.

TABLE 3

| f (mm) | d (m) | | |
|---|---|---|---|
| | 0.5–0.7 | 0.7–1.5 | 1.5–∞ |
| 28–35 | 0 | 1 | 2 |
| 35–50 | 3 | 4 | 5 |
| 50–70 | 6 | 7 | 8 |

TABLE 4

| n | a1 | a2 | a3 |
|---|---|---|---|
| 0 | −1.3 | −1.5 | −2.9 |
| 1 | −0.6 | −7.3 | −1.6 |
| 2 | −0.2 | −3.5 | −1.0 |
| 3 | 0.9 | 5.1 | 1.7 |
| 4 | 0.7 | 3.8 | 1.2 |
| 5 | 0.6 | 2.5 | 1.0 |
| 6 | 1.2 | 1.3 | 1.3 |
| 7 | 0.9 | 9.3 | 0.9 |

TABLE 4-continued

| n | a1 | a2 | a3 |
|---|---|---|---|
| 8 | 0.5 | 5.8 | 0.6 |

In Table 3, lens information (focal lengths f and focus positions d) determined by the CPU 202 are classified into nine groups in accordance with their values.

In general, even the distortion of the same lens changes depending on the focal length and the focus position. Therefore, the distortion data must be changed in accordance with the focal length and the focus position. This classification is performed in consideration of the rate of change in distortion with respect to the focal length and the focus position. That is, finer classification is performed as the change in distortion increases, and vice versa.

Table 4 is a conversion table for converting lens information n grouped in Table 3 into distortion data a1, a2, and a3.

FIG. 27 is a flow chart showing the sequence of a subroutine "distortion data conversion" in which the distortion data obtained in step S208 is converted, and the resultant data is read out from the ROM 205.

Figure 23:
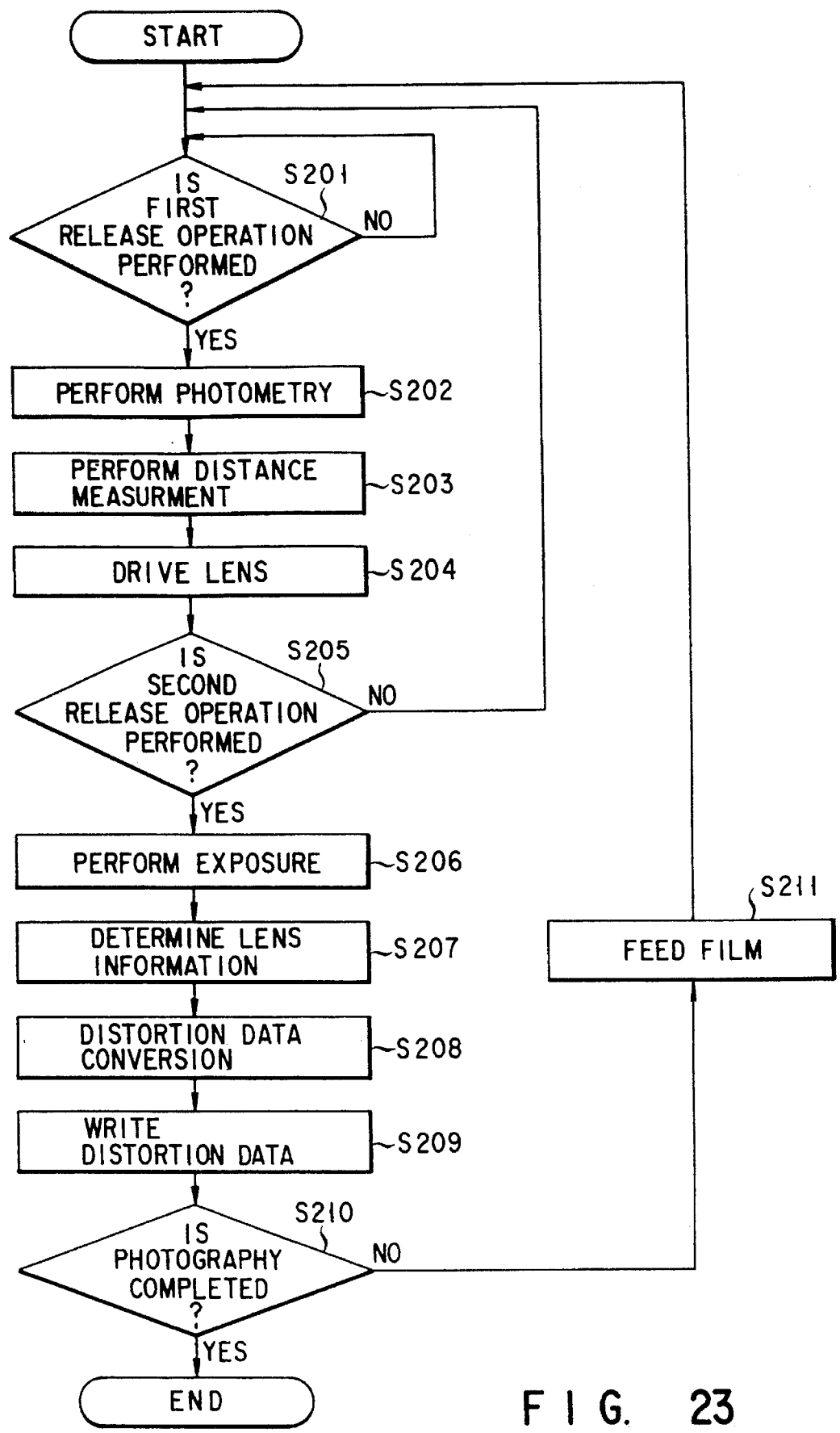
FIG. 23 is a flow chart for explaining the operation of the camera in the camera system shown in FIG. 22.

After the sequence is stated, the focal length f and the focus position d of the lens information in the photographic operation in step S207 in FIG. 23 are grouped according to Table 3 (step S221). The grouped lens information n is converted into the distortion data a1, a2, and a3 in accordance with Table 4 as the conversion table (step S222). The sequence is then completed.

Figure 28:
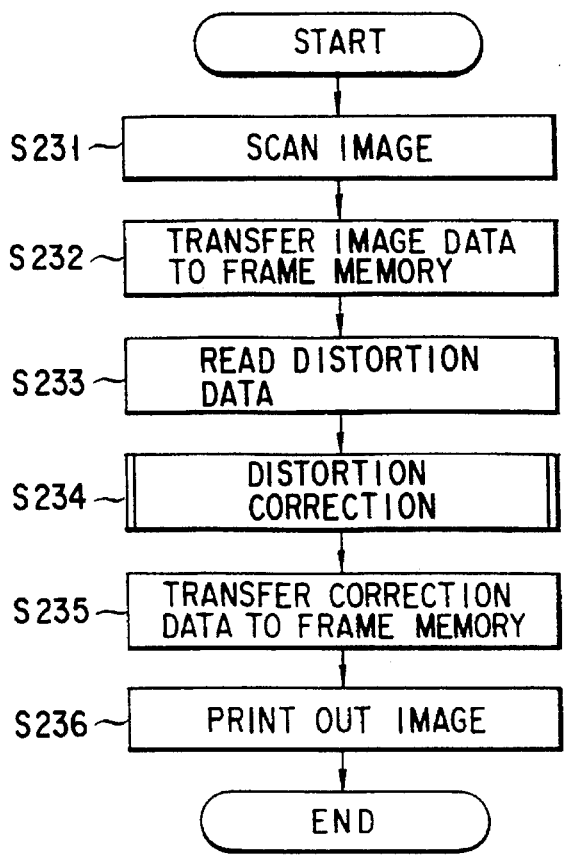
FIG. 28 is a flow chart for explaining the operation of an image processing unit.

The operation of the image processing unit 212 will be described below with reference to the flow chart of FIG. 28. The same reference numerals in the following description denote the same parts as in FIG. 22.

After the sequence is started, an image recorded on the film 210 is read by the film scanner 215 (step S231) and transferred to the frame memory 216 (step S232).

The distortion data recorded on the magnetic tape 211 is read by the distortion data read section 214 (step S233). The distortion of the image stored in the frame memory 216 is corrected by the CPU 213 using the read distortion data (step S234). The resultant data is transferred to the frame memory 217 (step S235). The corrected image is then output by the color printer 218 (step S236), and the sequence is completed.

Figure 29:
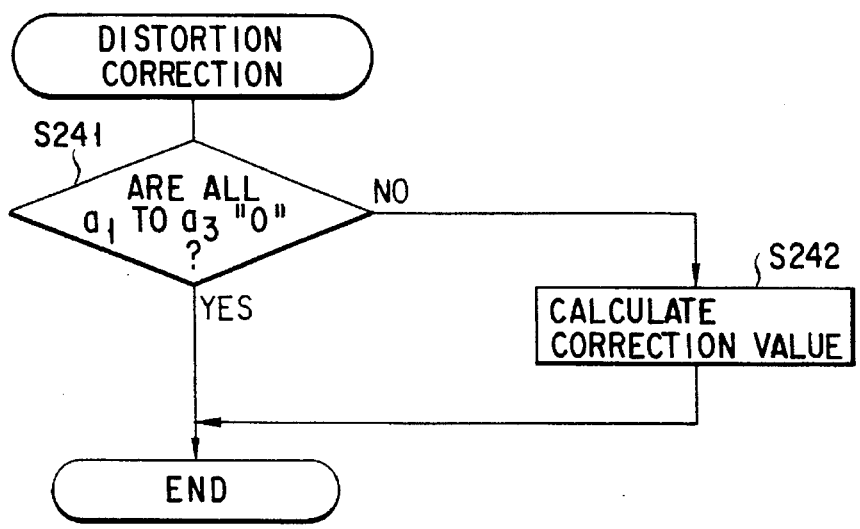
FIG. 29 is a flow chart showing a subroutine for correcting the distortion of an image by using distortion data.

The distortion correction in step S234 shown in FIG. 27 will be described below with reference to the flow chart of FIG. 29.

After the sequence is started, it is checked whether all the distortion data a1, a2, and a3 are "0"(step S241). If it is determined that all the data are "0"(YES), no distortion correction is performed, and the sequence is completed. If, however, it is determined that at least one of the data a1 to a3 is not "0"(NO), a correction value is calculated (step S242), and the sequence is completed.

A method of performing the correction calculation for the distortion correction in step S242 in FIG. 29 will be described in detail next. When the distortion data a1, a2, and a3 are given, an approximate curve of the distortion represented by equation (14) is obtained.

$$a(z)=a1z+a2z^2+a3z^3 \tag{16}$$

This curve represents the ratio of the distortion of the actual height to the ideal height, as indicated by equation (13). Equation (13) is solved with respect to the ideal image height z', as follows:

$$z'=\{1+a(z)/100\}z \tag{17}$$

That is, the ideal image height z' can be obtained by multiplying the actual image height z by (1+a/100).

In this embodiment, an image is read from the film 210. The read image is converted into a discrete digital image.

In this case, the actual image height z corresponds to a pixel located at a place separated from the center of the image by a distance z. Therefore, the distortion may be corrected by setting the value of a pixel of interest which is separated from the center of the image by a distance z to be the value of a pixel located at a distance z' on the extended line of the pixel of interest.

More specifically, since pixels are generally arranged on vertical and horizontal lines which are perpendicular to each other, coordinate conversion is performed with respect to a given pixel (x,y) of interest according to equations (18) and (19):

$$x = a \cos(\theta) \quad (18)$$

$$y = z \sin(\theta) \quad (19)$$

With this operation, the values z and θ are obtained, and the image height is caused to correspond to the actual image. A pixel (x',y') is then obtained by using the value z', calculated by using equation (17), according to equations (20) and (21):

$$x' = z' \cos(\theta) \quad (20)$$

$$y' = z' \sin(\theta) \quad (21)$$

If there is no pixel corresponding to (x',y'), a pixel having a value closest to (x',y') is used as a substitute.

If the distortion is negative, the area of the corrected image becomes larger than that of the original image. For this reason, even if pixels (x',y') corresponding to all pixels (x,y) are obtained, omission of pixels occurs at an marginal portion of the image. In this case, the omissions may be compensated by performing proper interpolation.

In contrast to this, if the distortion is positive, the area of the corrected image becomes smaller than that of the original image. For this reason, identical pixels (x',y') correspond to different pixels (x,y). In this case, the value of superposed pixels may be substituted by the average value or the like thereof.

With the above-described arrangement, distortion need not be corrected by the photographic lens itself, and hence the arrangement of the lens can be simplified. In addition, distortion correction can be performed at an arbitrary focal length and an arbitrary focus position. Therefore, a photographing image with higher quality can be provided.

FIG. 30 shows the schematic arrangement of a camera system according to the fifth embodiment of the present invention.

Similar to the fourth embodiment, this camera system is roughly constituted by a camera 221 capable of recording distortion data of the lens in a photographic operation, a film 229 having a magnetic tape 230 for recording the distortion data and designed to record an optical image, an image processing unit 231 for reading information constituted by the distortion data and the optical image, and a color printer 238 for printing out image data in color.

The fifth embodiment is different from the fourth embodiment in the following points. First, the fifth embodiment has no storage element corresponding to the ROM 205 shown in FIG. 22. Second, the distortion data write section 209 and the distortion data read section 214 are respectively replaced with a lens information write section 228 and a lens information read section 233. Lastly, a ROM 236 is incorporated in the image processing unit 231. Note that distortion data corresponding to a plurality of lenses used for a photographic operation are stored in the ROM 236.

The operation of the camera 221 in the camera system of this embodiment will be described next with reference to the flow chart of FIG. 31.

First of all, the sequence is started by turning on the main switch (not shown) of the camera 221. It is then checked whether a first release operation is performed by a photographer (step S251). If it is determined that the operation is performed (YES), photometry is performed by an exposure control section 226 (step S252), and distance measurement is performed by a distance measuring section 225 (step S253).

An aperture value is determined upon reception of the distance measurement result, and the lens is driven by a lens driving section 224. With this operation, an automatic focusing operation is completed (step S254).

Subsequently, it is checked whether a second release operation is performed by the photographer (step S255). If it is determined that the operation is performed (YES), an exposure operation is performed with the aperture lens position determined in steps S252 to S254 (step S256). Lens information (lens type, focal length, focus position, and aperture value) in the photographic operation is determined by the CPU 222 (step S257), and the lens information is written on the magnetic tape 230 by the lens information write section 228 (step S258).

It is checked whether the photographer finishes the photographic operation (step S259). If it is determined that the photographic operation is to be continued (NO), the film is fed (step S260), and the flow returns to step S251. If it is determined that the photographer finishes the photographic operation, the sequence is ended.

The operation of the image processing unit 231 will be described next with reference to the flow chart shown in FIG. 32.

After the sequence is started, an image recorded on the film 229 is read by a film scanner 234 (step S261), and is transferred to a frame memory 235 (step S262).

Subsequently, the lens information recorded on the magnetic tape 230 is read by the lens information read section 233 (step S263). The lens information is converted into distortion data by a CPU 232 using data stored in the ROM 236 (step S264). The distortion of the image stored in the frame memory 235 is corrected by using the distortion data (step S265).

The corrected image is transferred to a frame memory 237 (step S266). Furthermore, the corrected image is printed out in color by a color printer 238 (step S267), and the sequence is completed.

The flow chart shown in FIG. 33 is a subroutine for the distortion data conversion in step S264 shown in FIG. 32.

This distortion data conversion will be described below. After the sequence is started, a proper conversion table is selected from a plurality of conversion tables stored in the ROM 236 in accordance with "lens type" and "aperture value" of the read lens information (step S271). Thereafter, "focal length" and "focus position" of the read lens information in the photographic operation are grouped according to the conversion table selected in step S271 (step S272). Grouped lens position information n is converted into distortion data a1, a2, and a3 (step S273), and the sequence is ended.

In the embodiments of the present invention, distortion data is expressed by coefficients of third degree three of an aberration curve. However, distortion data may be expressed by coefficients of higher or lower degree. In addition, distortion data may not be developed into a power series, and may be expressed by the value of a distortion a(2) itself with respect to the image height z.

According to the above-described camera system, since the distortion of an image is corrected by using information on each frame in a photographic operation, distortion correction can be performed at an arbitrary focal length and an arbitrary focus position, thereby obtaining an image with high quality. Furthermore, in this embodiment, lens information on marginal attenuation data is recorded in units of frames. However, such information may be temporarily recorded on a recording medium such as a semiconductor memory, and the information may be collectively recorded in a film rewind operation upon completion of a photographic operation.

Therefore, the camera systems according to the fourth and fifth embodiments of the present invention, distortion correction need not be performed by the photographic lens itself, and hence the arrangement of the lens can be simplified so that a photographing image (photograph) without any distortion can be provided with a compact, lightweight camera.

As has been described above, according to the fourth and fifth embodiments of the present invention, there is provided a camera system constituted by a compact, lightweight camera and an image processing unit for obtaining an image without any distortion.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A degraded image correction apparatus comprising:
    an image signal output unit for converting an image on a film, which has undergone photography, into an image signal;
    an image storage unit for storing the image signal converted by said image signal output unit;
    a read unit for reading an identification code of a camera which is recorded on the film which has undergone photography;
    an information storage unit for recording the identification code read by said read unit and image quality degradation information in pairs; and
    an image processing unit for reading out the image quality degradation information from said information storage unit in accordance with the identification code read by said read unit, and correcting the image signal stored in said image storage unit by using the read image quality degradation information.

2. An apparatus according to claim 1, wherein the image quality degradation information stored in said information storage unit includes curvature-of-field data for correcting a curvature of field.

3. An apparatus according to claim 1, wherein the image quality degradation information stored in said information storage unit includes light amount irregularity data.

4. An apparatus according to claim 1, wherein the identification code of said camera includes bar code data.

5. An apparatus according to claim 1, further comprising a printer unit for performing a printing operation on the basis of the corrected image signal.

6. A degraded image correction apparatus for correcting an image photographed on a photographic film on which identification data of a camera is recorded, comprising:
    read means for reading the identification data;
    information output means for outputting image quality degradation information inherent in a photographing lens of said camera on the basis of the identification data read by said read means;
    image signal output means for converting an image photographed on the photographic film into an image signal, and outputting the image signal;
    retrieval means for retrieving the image quality degradation information output from said information output means; and
    correction means for correcting the image signal output from said image signal output means by using the image quality degradation information retrieved by said retrieval means.

7. An apparatus according to claim 6, wherein the image quality degradation information includes data for correcting a curvature of field.

8. An apparatus according to claim 6, wherein the image quality degradation information includes data for correcting light amount irregularity.

9. An apparatus according to claim 6, wherein the image quality degradation information includes data for correcting marginal attenuation irregularity.

10. A degraded image correction system comprising:
    a camera for photographing an image on a photographic film having an information recording portion; and
    a degraded image correction apparatus for correcting a degraded image on the film on which the image is photographed by said camera,
    said camera including
        a photographing lens,
        a correction data signal generating section for generating correction data representing at least one of marginal attenuation and light amount irregularity in accordance with lens information in a photographic operation performed by using said photographing lens, and
        a recording unit for recording the correction data, generated by said correction data signal generating section, on the information recording portion of the photographic film, and
    said degraded image correction apparatus including
        a film scanner for reading the image photographed on the photographic film and converting the read image into an image signal,
        a storage unit for storing the image signal read by said film scanner,
        an information read section for reading the correction data stored in the information recording portion of the photographic film, and
        an image correction unit for correcting the image signal stored in said storage section on the basis of the correction data read by said information read section.

11. A system according to claim 10, wherein said correction data signal generating section includes means for generating the correction data on the basis of a focal length and aperture value of said photographing lens.

12. A degraded image correction apparatus for correcting a degraded image on a film used in a photographic operation performed by a camera for photographing an image on a photographic film having an information recording portion, said camera having a recording unit for recording lens information, set in the photographic operation, on the information recording portion of the photographic film, comprising:

a film scanner for reading an image photographed on the photographic film and converting the image into an image signal;

a first storage section for storing the image signal read by said film scanner;

a second storage section for storing the lens information and correction data in pairs;

an information read section for reading the lens information stored in the information recording portion of the photographic film;

correction data read means for reading correction data from said second storage section on the basis of the lens information read by said information read section; and image correction means for correcting the image signal stored in said first storage section on the basis of the correction data read by said correction data read means.

13. An apparatus according to claim 12, wherein the correction data includes data indicating marginal attenuation of a photographing lens of said camera.

14. An apparatus according to claim 12, wherein the correction data includes data indicating distortion of a photographic lens of said camera.

15. A camera used in combination with a degraded image correction apparatus for correcting an image photographed on a photographic film having an information recording portion, comprising:

a photographing lens;

a correction data signal generating section for generating correction data indicating at least one of marginal attenuation and light amount irregularity and used by said degraded image correction apparatus to correct the image, on the basis of lens information in a photographic operation performed by using said photographing lens; and a recording unit for recording the correction data on the information recording portion of the photographic film.

16. A camera according to claim 15, wherein said correction data signal generating section includes means for generating the correction data on the basis of a focal length and aperture value of said photographing lens.

17. A camera according to claim 15, wherein said correction data signal generating section includes means for generating the correction data in units of frames.

18. A degraded image correction system comprising:

a camera for photographing an image on a photographic film having an information recording portion; and a degraded image correction apparatus for correcting a degraded image on the film which has undergone photography performed by said camera, said camera including a photographing lens, a lens information generating section for generating lens information on said photographing lens in a photographic operation, and a recording unit for recording the lens information on the information recording portion of the photographic film, and said degraded image correction apparatus including a film scanner for reading an image photographed on the photographic film and converting the image into an image signal, an image signal storage section for storing the image signal read by said film scanner, an information read section for reading the lens information stored in the information recording portion of the photographic film, a correction data storage section for storing the lens information and correction data for correcting the image signal in pairs, a correction data read section for reading the correction data stored in said correction data storage section on the basis of the lens information read by said information read section, and an image correction unit for correcting the image signal stored in said image signal storage section on the basis of the correction data read by said correction data read section.

19. A system according to claim 18, wherein the correction data includes data indicating marginal attenuation of said photographing lens of said camera.

20. A system according to claim 19, wherein said correction data read section includes means for reading out the correction data on the basis of a focal length and aperture value of said photographing lens.

21. A system according to claim 18, wherein the correction data includes data indicating a distortion of said photographing lens.

22. A system according to claim 21, wherein said correction data read section includes means for reading out the correction data on the basis of a focal length and aperture value of said photographing lens.

23. An image recording/reproducing system comprising:

a recording medium comprising:

an image recording area on which an object image is recorded, and a data recording area on which predetermined data is recorded;

a photographing unit comprising:

a photographing optical system for photographing the object image, image recording means for recording the object image, which passes through said photographing optical system, as image data, on the image recording area of said recording medium, storage means for storing predetermined identification data, and information recording means for recording information based on the identification data stored in said storage means, as the predetermined data, on the data recording area of said recording medium; and an image reproducing unit comprising:

read means for reading the image data recorded on the image recording area of said recording medium, and image reproducing means for reproducing the image data read out by said read means into a visible image, said image reproducing means including correction means for correcting the image data on the basis of the identification data recorded on the data recording area of said recording medium, thereby generating an image which is substantially free from a degradation in image quality.

24. A system according to claim 23, wherein said recording medium includes a silver salt film, and said data storage area includes a magnetic recording portion.

25. A system according to claim 23, wherein the identification data includes data for identifying a type of said photographing unit.

26. A system according to claim 23, wherein said correction means includes means for correcting light amount irregularity of the object image with respect to a predetermined light amount on the basis of the identification data.

27. A system according to claim 23, wherein said correction means includes means for correcting a distortion of the object image on the basis of the identification data.

28. An image recording/reproducing system comprising:

a recording medium comprising:

an image recording area on which an object image is recorded, and a data recording area on which predetermined data is recorded;

a photographing unit comprising:

a photographing optical system for photographing the object image, image recording means for recording the object image, which passes through said photographing optical system, on the image recording area of said recording medium, data storage means for storing degradation data which is information inherent in said photographing unit and associated with at least one of marginal attenuation and light amount irregularity caused in the object image in a photographic operation, and information storage means for recording information, based on the degradation data stored in said data storage means, on the data recording area of said recording medium; and an image reproducing unit comprising:

image storage means for generating and storing object image data from the object image recorded on the image recording area of said recording medium, and image reproducing means for reproducing the object image data stored in said image storage means into a visible image, said image reproducing means including correction means for correcting the object image data on the basis of the degradation data recorded on the data recording area of said recording medium, thereby generating an image which is substantially free from a degradation in image quality.

29. A system according to claim 28, wherein said recording medium includes a silver salt film, and said data recording area includes a magnetic recording portion.

30. A system according to claim 28, wherein the degradation data stored in said data storage means is constituted by a plurality of data combined with a photographing state of said photographing unit, and said correction means includes means for obtaining a proper light amount on the basis of the plurality of data of the degradation data.

31. A photographing apparatus in which a recording medium capable of recording an object image and various data is loaded, and the object image and data are recorded on said recording medium, comprising:

a photographing optical system for guiding a light beam from an object to be photographed to said recording medium;

storage means for storing data associated with a degradation in image quality of the object image which is caused by an influence of said photographing optical system;

detection means for detecting a state of said photographing optical system;

output means for outputting degradation data associated with a degradation in image quality and stored in said storage means in accordance with a detection result obtained by said detection means; and storage means for recording data from said output means on said recording medium.

32. An apparatus according to claim 31, wherein the data includes data associated with light amount irregularity of the object image with respect to a predetermined light amount which is caused by an influence of said photographing optical system.

33. An apparatus according to claim 31, wherein the data includes data associated with a distortion of the object image which is caused by an influence of said photographing optical system.

34. An apparatus according to claim 31, wherein the data stored in said storage means includes a plurality of data combined with a photographing state of said photographing unit.

35. An image reproducing apparatus for reproducing an object image from a recording medium having an object image recording portion and a data recording portion, comprising:

image read means for reading the object image, recorded on the image recording portion of said recording medium, as image data;

data read means for reading photographing unit data recorded on the data recording portion of said recording medium and indicating information associated with a photographing unit used to record the object image on said recording medium;

storage means for storing a combination of the photographing unit data and data for correcting a degradation in image quality caused by an influence of said photographing unit;

output means for outputting correction data from said storage means in accordance with the photographing unit data read out by said read means;

correction means for correcting the image data on the basis of the correction data from said output means; and image reproducing means for reproducing an electronic image in accordance with an output from said correction means.

36. An apparatus according to claim 35, wherein the photographing unit data includes data for identifying a type of said photographing unit.

37. An apparatus according to claim 35, wherein the correction data includes data for correcting light amount irregularity of the object image, with respect to a predetermined light amount, which irregularity is based on a photographing optical system in said photographing unit.

38. An apparatus according to claim 35, wherein the correction data stored in said storage means is constituted by a plurality of data combined with a photographing state of said photographing unit, and said correction means includes means for obtaining a proper light amount on the basis of the plurality of data of the correction data.

39. An image reproducing apparatus for reproducing an object image from a recording medium having an object image recording portion and a data recording portion, comprising:

image read means for reading the object image recorded on the image recording portion on said recording medium as image data;

data read means for reading degradation data recorded on the data recording portion on said recording medium and indicating information associated with marginal attenuation or light amount irregularity based on a photographing unit used to record the object image on said recording medium;

correction means for correcting the image data in accordance with the degradation data read by said read means; and image reproducing means for reproducing an electronic image in accordance with an output from said correction means.

40. An apparatus according to claim 39, wherein the degradation data recorded on the data recording portion is constituted by a plurality of data combined with a photographing state of said photographing unit, and said correction means includes means for correcting the image data on the basis of the plurality of data of the degradation data.

* * * * *